(12) United States Patent
Tang et al.

(10) Patent No.: US 11,965,100 B2
(45) Date of Patent: Apr. 23, 2024

(54) AGGREGATION-INDUCED EMISSION LUMINOGENS USEFUL FOR CANCER CELL DISCRIMINATION AND MONITORING

(71) Applicant: The Hong Kong University of Science and Technology, Hong Kong (CN)

(72) Inventors: Benzhong Tang, Hong Kong (CN); Ruoyao Zhang, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 355 days.

(21) Appl. No.: 17/301,941

(22) Filed: Apr. 20, 2021

(65) Prior Publication Data

US 2021/0324199 A1    Oct. 21, 2021

Related U.S. Application Data

(60) Provisional application No. 63/101,200, filed on Apr. 21, 2020.

(51) Int. Cl.
*C09B 23/06* (2006.01)
*G01N 21/64* (2006.01)

(52) U.S. Cl.
CPC .......... *C09B 23/06* (2013.01); *G01N 21/6402* (2013.01); *G01N 21/6428* (2013.01); *G01N 21/6458* (2013.01); *G01N 2021/6439* (2013.01); *G01N 2201/06113* (2013.01)

(58) Field of Classification Search
None
See application file for complete search history.

(56) References Cited

U.S. PATENT DOCUMENTS

2015/0336993 A1* 11/2015 Cheng ................. C07F 9/65583
424/1.89

FOREIGN PATENT DOCUMENTS

| CN | 113825741 A | 12/2021 |
| WO | 2016/206615 A1 | 12/2016 |
| WO | 2018/210334 A1 | 11/2018 |

OTHER PUBLICATIONS

Supporting information of "Zheng et al.; Reaction-free and MMP-independent fluorescent probes for long-term mitochondria visualization and tracking. Chem. Sci., 2019, 10, 1994-2000."*
Guofen Song et al., Low molecular weight fluorescent probes with good photostability for imaging RNA-rich nucleolus and RNA in cytoplasm in living cell, Biomaterials 35 (2014) 2103-2112.
Jia Wang et al., Investigating the interactions of a novel anticancer delocalized lipophilic cation and its precursor compound with human serum albumin, RSC Advances, 2014, 4, 18205-18216.
First Office Action of CN2021104201264 issued from the China National Intellectual Property Administration dated Feb. 23, 2023.
Chen et al.; AIE-active theranostic system: selective staining and killing of cancer cells. Chem. Sci., 2017, 8, 1822-1830.
Zhang et al.; Reaction-free and MMP-independent fluorescent probes for long-term mitochondria visualization and tracking. Chem. Sci., 2019, 10, 1994-2000.

* cited by examiner

*Primary Examiner* — Po-Chih Chen
(74) *Attorney, Agent, or Firm* — S&F/WEHRW

(57) ABSTRACT

Provided herein are aggregation-induced emission luminogens useful for imaging and/or detecting cancer cells and dynamically monitoring the viability of cancer cells and methods of use and preparation thereof.

5 Claims, 24 Drawing Sheets

B

C

| Dyes | IVP-02 | IVP-04 | IVP-22 | IVP-42 | IVP-06 | IVP-62 |
|---|---|---|---|---|---|---|
| $k$ | $6.17 \times 10^6$ | $2.49 \times 10^6$ | $3.57 \times 10^6$ | $4.42 \times 10^6$ | $7.70 \times 10^5$ | $9.78 \times 10^5$ |
| $E$ (kcal/mol) | -5.43 | -4.84 | -5.66 | -4.90 | -4.32 | -4.37 |

AGGREGATION-INDUCED EMISSION LUMINOGENS USEFUL FOR CANCER CELL DISCRIMINATION AND MONITORING

CROSS REFERENCE TO RELATED APPLICATIONS

This application claims the benefit of priority of U.S. Provisional Application No. 63/101,200 filed on Apr. 21, 2020, which is hereby incorporated by reference in its entirety.

TECHNICAL FIELD

The present disclosure generally relates to fluorescent dyes useful for cancer cell detection, discrimination, and/or dynamic monitoring.

BACKGROUND

Cancer is one of the greatest enemies of humanity. Early detection of cancer before metastasis is very important in increasing the survival rate of cancer patients. Different from normal cells, cancer cells overexpress some receptors, which can serve as target biomarkers for identifying cancer cells.

Currently, immunofluorescence and aptamer-based fluorescent systems are common tools for cancer detection. In immunofluorescence cancer detection, an antibody highly specific to the overexpressed receptor is conjugated with a fluorescent dye.

However, in the early stages of cancer, the receptors can be expressed at a lower level, which increases the difficulty in early cancer detection. Moreover, the preparation of specific recognition elements against cancer cell receptors is complex and costly, and the conjugation of fluorescent dyes to antibodies may affect antibody binding and selectivity.

In cancer detection with aptamer-based fluorescent systems, screening aptamers specific to cancer cells and conjugation of fluorescent dyes to the identified aptamers are also complicated processes. Although these specific ligands can efficiently identify cancer cell types, they are limited by available tumor cell species, especially from unknown cancers, which is hard to achieve wide-spectrum cancer screening. Therefore, there is still much room for improvement for immunofluorescence cancer detection. A universal and convenient method is strongly needed for wide-spectrum cancer cell detection.

The viability of autologous cells is closely related to human health. Monitoring cell viability is important for human health, sub-health, and disease detection. Particularly, in terms of drug screening including drug development and efficacy evaluation, cell viability monitoring also plays an important role. The standard method commonly used for detecting cell viability is MTT assay. By reduction of mitochondrial reductase, MTT with yellow color will turn into formazan with deep purple color. Then by measuring the absorbance of formazan at 570 nm, the cell viability can be obtained. However, the MTT assay is very time consuming and detailed information, such as the cell morphology cannot be visualized.

Fluorescence microscopy is a powerful tool for in situ real-time detecting and monitoring biosamples in vivo. Researchers have developed fluorescent probes for cell viability detection. For example, Calcein AM is non-fluorescent in dead cells, but exhibits strong fluorescence in live cells. Fluorescein labelled annexin V is used for the detection of phosphatidylserine expression on early apoptotic cells. Propidium iodide (PI) can only stain late apoptotic and dead cells, but cannot enter live cells. However, it is difficult to use these probes to monitor cell viability in real time. New systems for fast and in situ real-time monitoring cell viability are highly desirable.

In response to these challenges, a variety of organic fluorophores have been developed for biosample-imaging. Traditional aromatic and planar fluorophores have poor solubility in aqueous conditions. Increasing the amount of such fluorophores in solution would lead to aggregation-caused quenching (ACQ). While in very dilute solution, the fluorescence is too weak to be detected and easily bleached by irradiation.

Generally, a physical effect is often positively related to the amount of the added substance. As the membrane permeability and mitochondrial membrane potential ($\Delta\psi_m$) of cancer cells is higher than that of normal cells, theoretically more fluorescent molecules would enter cancer cells than normal cells, providing the opportunity for cancer cell discrimination. For traditional fluorophores with ACQ effect, fewer molecules entering normal cells leads to relatively weak fluorescence signals. However, more molecules entering cancer cells in turn leads to a decrease in fluorescence due to ACQ thereby attenuating the fluorescence signal difference between cancer and normal cells. Therefore, it is actually difficult to distinguish cancer cells from normal cells by traditional fluorophores due to the low contrast between them.

There is thus a need for improved compounds and methods useful for imaging cells, such as cancer cells, detecting cancer cells in a sample, and monitoring the viability of cancer cells.

SUMMARY

The present disclosure provides a family of unique aggregation-induced emission luminogens (AIEgens) for cancer cell discrimination and/or cellular viability monitoring. The AIEgens described herein are highly emissive at high concentration. As cancer cells possess higher membrane permeability and $\Delta\psi_m$ than that of normal cells, more AIEgens enter cancer cells while less AIEgens enter normal cells. Consequently, AIEgens emit substantially stronger fluorescence in cancer cells than in normal cells, allowing cancer cell discrimination.

In a first aspect, provided herein is a method for imaging a cell in a sample, the method comprising: contacting the sample with an aggregation-induced emission luminogen (AIEgen) of Formula 1:

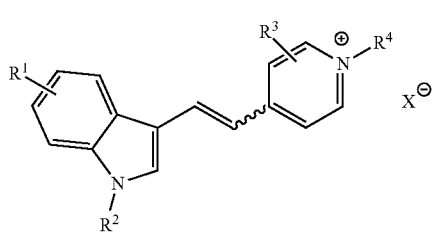

wherein X is an anion,
each of $R^1$ and $R^3$ is independently hydrogen, halide, alkyl, OR, CN, $NO_2$, or $NR_2$;
$R^2$ is hydrogen or alkyl;
$R^4$ is alkyl; and R for each occurrence is independently hydrogen or alkyl; irradiating the cell with light; and detecting the fluorescence of the compound.

In certain embodiments, the cell is a cancer cell.
In certain embodiments, each of $R^1$ and $R^3$ is hydrogen.
In certain embodiments, $R^2$ is hydrogen or $C_1$-$C_5$ alkyl.
In certain embodiments, $R^4$ is $C_1$-$C_5$ alkyl.
In certain embodiments, the AIEgen has Formula 2:

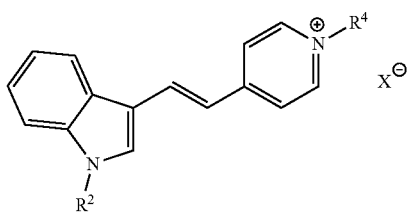

2 wherein X is an anion;
$R^2$ is hydrogen or $C_1$-$C_5$ alkyl; and
$R^4$ is $C_1$-$C_5$ alkyl.

In certain embodiments, the AIEgen is selected from the group consisting of:

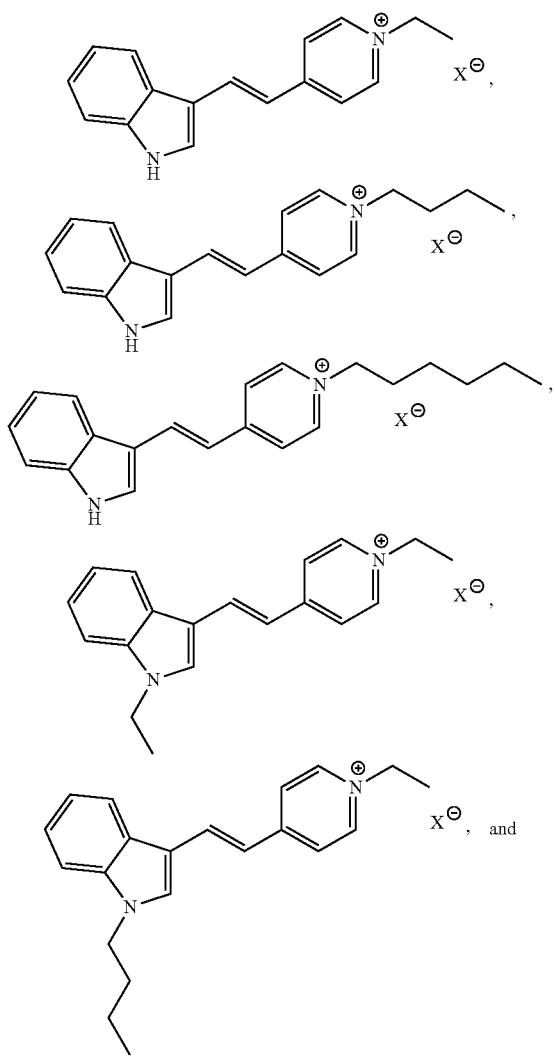

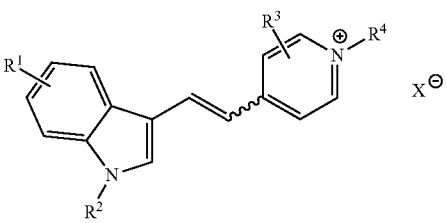

In certain embodiments, X is $PF_6^-$.

In certain embodiments, the step of detecting the fluorescence of the AIEgen comprises monitoring the migration of the AIEgen from the mitochondrion to the nucleolus of the cancer cell.

In certain embodiments, the method further comprising the step of determining the viability of the cancer cell based on the migration of the AIEgen from the mitochondrion to the nucleolus.

In certain embodiments, the viability of the cancer cell is determined while the cancer cell is in the presence of an anti-cancer agent.

In certain embodiments, $R^2$ is hydrogen or $C_2$-$C_4$ alkyl; and $R^4$ is $C_2$-$C_4$ alkyl.

In certain embodiments, the cell is irradiated with light at a wavelength between 350-550 nm; and the fluorescence is detected at a wavelength between 450-650 nm.

In a second aspect, provided herein is a method for detecting a cancer cell in a sample suspected of comprising the cancer cell, the method comprising: contacting the sample with an AIEgen of Formula 1:

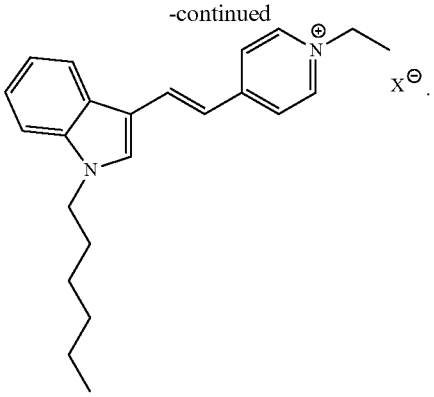

1 wherein X is an anion;
each of $R^1$ and $R^3$ is independently hydrogen, halide, alkyl, OR, CN, $NO_2$, or $NR_2$;
$R^2$ is hydrogen or alkyl;
$R^4$ is alkyl; and
R for each occurrence is independently hydrogen or alkyl;
irradiating the sample with light;
detecting the fluorescence of the AIEgen; and determining whether the sample comprises the cancer cell based on the detected fluorescence.

In certain embodiments, $R^2$ is $C_1$-$C_4$ alkyl; and $R^4$ is $C_1$-$C_4$ alkyl; or $R^2$ is hydrogen and $R^4$ is ethyl.

In certain embodiments, the AIEgen is selected from the group consisting of:

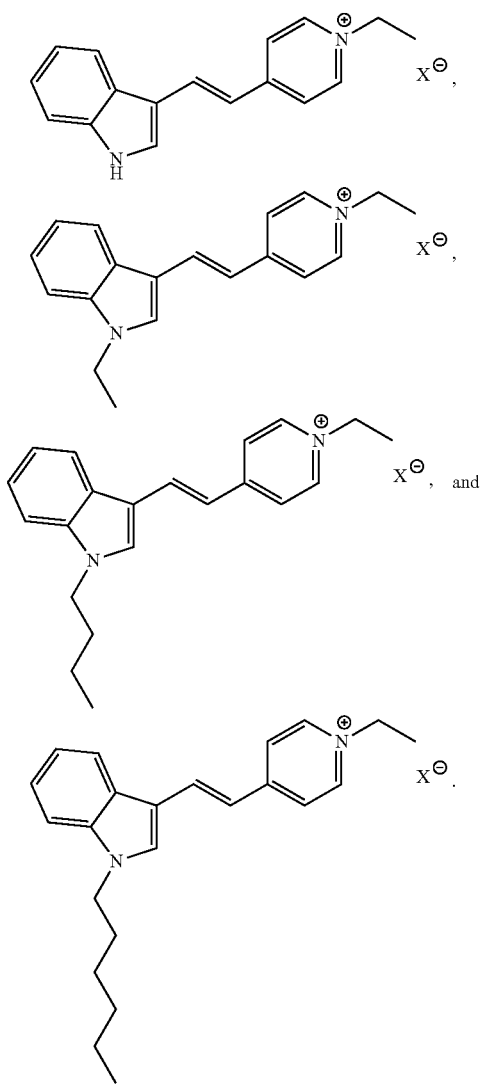

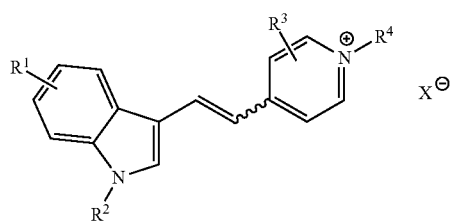

In certain embodiments, the cancer cell is a lung cancer cell or a cervical cancer cell.

In a third aspect, provided herein is an AIEgen of Formula 3:

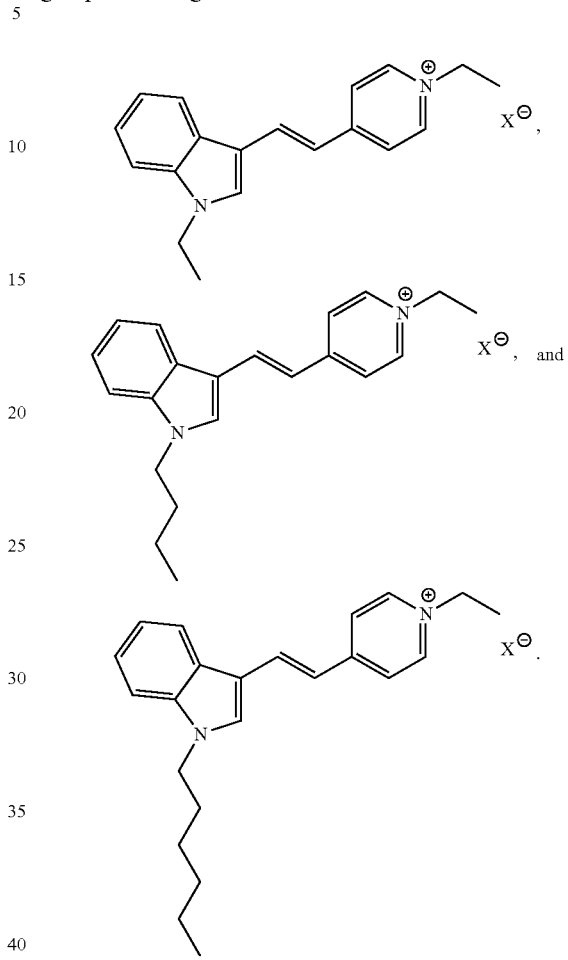

wherein X is an anion;
each of $R^1$ and $R^3$ is independently hydrogen, halide, alkyl, OR, CN, $NO_2$, or $NR_2$;
each of $R^2$ and $R^4$ are independently alkyl; and
R for each occurrence is independently hydrogen or alkyl.

In certain embodiments, each of $R^1$ and $R^3$ is hydrogen; and $R^2$ and $R^4$ are independently $C_1$-$C_6$ alkyl.

In certain embodiments, the AIEgen is selected from the group consisting of:

As is known, some important positions or molecules are negatively charged inside a cell, such as mitochondria and nucleic acid in the nucleus. Lipophilic cations are inclined to target these negatively charged positions or molecules through electrostatic interaction. Optimizing the charge and lipophilicity of AIEgens would realize the change of dyeing position, according to variation of the cell viability. Here we designed and synthesized a series of AIEgens, which can selectively stain cancer cells as well as monitor cell viability through mitochondrion-nucleolus migration.

The present subject matter generally relates to a series of AIEgens molecules bearing different length alkyl chain. On one hand, IVP-02, 22, 42, 62 can distinguish cancer cells from normal cells, because the membrane permeability and mitochondrial membrane potential of cancer cells is higher than that of normal cells. Compared with IVP-02, 22, 42, and 62, more IVP-04 and 06 molecules enter normal cells. The obvious difference between IVP-02, 22, 42, 62, and IVP-04, 06 is the length of the alkyl chain at pyridinium salt side. The length of alkyl chain at pyridinium salt side determines the ionic radius. Without wishing to be bound by theory, it is believed, that the longer the alkyl chain, the larger the ionic radius, which allows the AIEgen to more easily enter the cell. IVP-04 and 06 can stain cancer and normal cells simultaneously. The brightness in cancer cells is higher than that in normal cells, because the mitochondria membrane potential of cancer cells is higher than that of normal cells.

The other aspect is cellular viability monitoring. IVP-02, 04, 22, and 42 can monitor the viability of cancer cells through mitochondrion-nucleolus migration, while IVP-06 and 62 cannot due to the stronger hydrophobic interaction between IVP-06, 62 and phospholipids and lower affinity to RNA. Finally, IVP-02 has good two-photon properties and low cytotoxicity. These IVP molecules shows excellent performance in cancer cell detection, cancer cell metastasis monitoring, and they show great potential in evaluating the activity and efficacy of drugs for cancer therapy. This work provides theoretical and experimental basis for the design of other fluorescent probes to realize cancer cell discrimination and dynamic viability monitoring.

BRIEF DESCRIPTION OF THE DRAWINGS

The above and other objects and features of the present disclosure will become apparent from the following description of the disclosure, when taken in conjunction with the accompanying drawings.

DETAILED DESCRIPTION

Definitions

Figure 1:
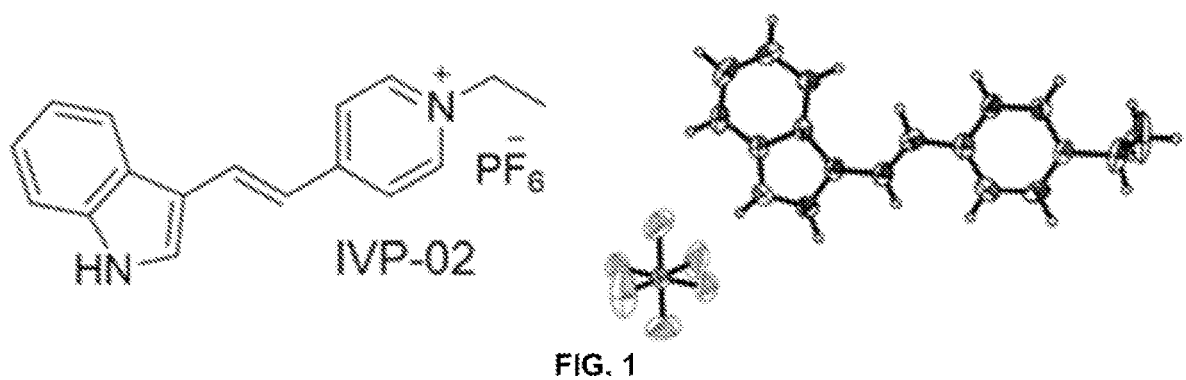
FIG. 1 Chemical structure of IVP-02 and its single-molecular configuration in single crystal cell.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

It should be understood that the order of steps or order for performing certain actions is immaterial so long as the present teachings remain operable. Moreover, two or more steps or actions may be conducted simultaneously.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10%, ±7%, ±5%, ±3%, ±1%, or ±0% variation from the nominal value unless otherwise indicated or inferred.

The term "composition" is intended to encompass a product comprising the specified ingredients in the specified amounts, as well as any product that results, directly or indirectly, from combinations of the specified ingredients in the specified amounts.

As used herein, unless otherwise indicated, the term "halo" or "halide" includes fluoro, chloro, bromo or iodo.

As used herein, "alkyl" refers to a straight-chain or branched saturated hydrocarbon group. Examples of alkyl groups include methyl-, ethyl-, propyl (e.g., n-propyl and isopropyl), butyl (e.g., n-butyl, iso-butyl, sec-butyl, tert-butyl), pentyl groups (e.g., 1-methylbutyl, 2-methylbutyl, iso-pentyl, tert-pentyl, 1,2-dimethylpropyl, neopentyl, and 1-ethylpropyl), hexyl groups, and the like. In various embodiments, an alkyl group can have 1 to 40 carbon atoms (i.e., C1-40 alkyl group), for example, 1-30 carbon atoms (i.e., C1-30 alkyl group). In certain embodiments, an alkyl group can have 1 to 6 carbon atoms, and can be referred to as a "lower alkyl group." Examples of lower alkyl groups include methyl, ethyl, propyl (e.g., n-propyl and isopropyl), and butyl groups (e.g., n-butyl, isobutyl, sec-butyl, tert-butyl). In certain embodiments, alkyl groups can be optionally substituted as described herein. An alkyl group is generally not substituted with another alkyl group, an alkenyl group, or an alkynyl group.

As used herein, the term "pharmaceutically acceptable anion" refers to those anions which are, within the scope of sound medical judgment, suitable for use in contact with the tissues of subjects without undue toxicity, irritation, allergic response and the like, and are commensurate with a reasonable benefit/risk ratio. Pharmaceutically acceptable anions are well known in the art. For example, Berge et al. describes pharmaceutically acceptable anions in detail in J. Pharmaceutical Sciences (1977) 66:1-19. Pharmaceutically acceptable anions included in the compounds provided herein include suitable inorganic and organic anions. Examples of pharmaceutically acceptable, nontoxic inorganic anions, such as chloride, bromide, phosphate, sulfate, hexafluorophosphate, and perchlorate or organic anions, such as acetate, oxalate, maleate, tartrate, citrate, succinate, or malonate. Other pharmaceutically acceptable anions include adipate, alginate, ascorbate, aspartate, benzenesulfonate, besylate, benzoate, bisulfate, borate, butyrate, camphorate, camphorsulfonate, citrate, cyclopentanepropionate, digluconate, dodecylsulfate, ethanesulfonate, formate, fumarate, glucoheptonate, glycerophosphate, gluconate, hemisulfate, heptanoate, hexanoate, iodide, 2-hydroxy-ethanesulfonate, lactobionate, lactate, laurate, lauryl sulfate, malate, malonate, methanesulfonate, 2-naphthalenesulfonate, nicotinate, nitrate, oleate, oxalate, palmitate, pamoate, pectinate, persulfate, 3-phenylpropionate, phosphate, picrate, pivalate, propionate, stearate, succinate, sulfate, tartrate, thiocyanate, p-toluenesulfonate, undecanoate, valerate, and the like.

The phrase "aggregation-induced emission" or "AIE" as used herein refers to the enhancement of light-emission by a fluorescent compound upon aggregation in the amorphous or crystalline (solid) states of the fluorescent compound, whereas the fluorescent compound exhibits weak or substantially no emission in dilute solutions.

The term "$\lambda_{ex}$" as used herein refers to the excitation wavelength.

The term "$\lambda_{em}$" as used herein refers to the emission wavelength.

The term "sample" as used herein relates to a material or mixture of materials, typically, although not necessarily, in fluid form, but can also be in solid, suspected of containing one or more cancer cells. In certain embodiments, the sample is derived from a biological sample, such as a body fluid, a sample from a tissue or an organ, or a sample of wash/rinse fluid or a swab or smear obtained from an outer or inner body surface. In certain embodiments, samples of stool, urine, saliva, cerebrospinal fluid, blood, serum, plasma, or lacrimal fluid are encompassed as samples by the methods described herein.

The present disclosure provides AIEgens and methods useful for imaging cells, such as cancer cells, detecting cancer cells in a sample, and monitoring the viability of a cancer cell. In certain embodiments, the AIEgen has the Formula 1:

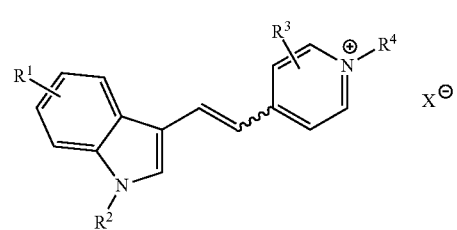

wherein X is an anion;
each of $R^1$ and $R^3$ is independently hydrogen, halide, alkyl, OR, CN, $NO_2$, or $NR_2$;

$R^2$ is hydrogen or alkyl;

$R^4$ is alkyl; and

R for each occurrence is independently hydrogen or alkyl.

The double bond present in the AIEgen of Formula 1 may be a cis double bond or a trans double bond. In certain embodiments, the double bond in the AIEgen of Formula 1 is a trans double bond.

In certain embodiments, each of $R^1$ and $R^3$ is independently hydrogen, fluoride, chloride, bromide, alkyl, OR, CN, $NO_2$, or $NR_2$, wherein R is hydrogen, $C_1$-$C_{12}$ alkyl, $C_1$-$C_{10}$ alkyl, $C_1$-$C_8$ alkyl, $C_1$-$C_6$ alkyl, $C_1$-$C_4$ alkyl, or $C_1$-$C_2$ alkyl. In certain embodiments, each of $R^1$ and $R^3$ is hydrogen.

In certain embodiments, $R^2$ is hydrogen, $C_1$-$C_{12}$ alkyl, $C_1$-$C_{10}$ alkyl, $C_1$-$C_8$ alkyl, $C_1$-$C_6$ alkyl, $C_2$-$C_6$ alkyl, $C_1$-$C_5$ alkyl, $C_2$-$C_5$ alkyl, $C_1$-$C_4$ alkyl, or $C_2$-$C_4$ alkyl.

In certain embodiments, $R^2$ is hydrogen, $C_1$-$C_5$ alkyl, $C_2$-$C_5$ alkyl, $C_1$-$C_4$ alkyl, or $C_2$-$C_4$ alkyl. In certain embodiments, $R^2$ is hydrogen or $C_2$-$C_4$ alkyl.

In certain embodiments, $R^4$ is $C_1$-$C_{12}$ alkyl, $C_1$-$C_{10}$ alkyl, $C_1$-$C_8$ alkyl, $C_1$-$C_6$ alkyl, $C_2$-$C_6$ alkyl, $C_1$-$C_5$ alkyl, $C_2$-$C_5$ alkyl, $C_1$-$C_4$ alkyl, or $C_2$-$C_4$ alkyl. In certain embodiments, $R^4$ is $C_1$-$C_5$ alkyl, $C_2$-$C_5$ alkyl, $C_1$-$C_4$ alkyl, or $C_2$-$C_4$ alkyl. In certain embodiments, $R^4$ is $C_2$-$C_4$ alkyl.

X can be one or more pharmaceutically acceptable anions including, but not limited to, chloride, bromide, phosphate, sulfate, hexafluorophosphate, tetrafluoroborate, perchlorate, acetate acid, oxalate, maleate, tartrate, citrate, succinate, malonate, adipate, alginate, ascorbate, aspartate, benzenesulfonate, besylate, benzoate, bisulfate, borate, butyrate, camphorate, camphorsulfonate, citrate, cyclopentanepropionate, digluconate, dodecylsulfate, ethanesulfonate, formate, fumarate, glucoheptonate, glycerophosphate, gluconate, hemisulfate, heptanoate, hexanoate, iodide, 2-hydroxyethanesulfonate, lactobionate, lactate, laurate, lauryl sulfate, malate, malonate, methanesulfonate, 2-naphthalenesulfonate, nicotinate, nitrate, oleate, oxalate, palmitate, pamoate, pectinate, persulfate, 3-phenylpropionate, phosphate, picrate, pivalate, propionate, stearate, succinate, sulfate, tartrate, thiocyanate, p-toluenesulfonate, undecanoate, valerate, and the like. In certain embodiments, X is hexafluorophosphate.

In certain embodiments, $R^2$ is hydrogen, $C_1$-$C_5$ alkyl, $C_2$-$C_5$ alkyl, $C_1$-$C_4$ alkyl, or $C_2$-$C_4$ alkyl; and $R^4$ is $C_1$-$C_5$ alkyl, $C_2$-$C_5$ alkyl, $C_1$-$C_4$ alkyl, or $C_2$-$C_4$ alkyl. In certain embodiments, $R^2$ is hydrogen or $C_2$-$C_4$ alkyl; and $R^4$ is $C_2$-$C_4$ alkyl.

In certain embodiments, the AIEgen has Formula 2:

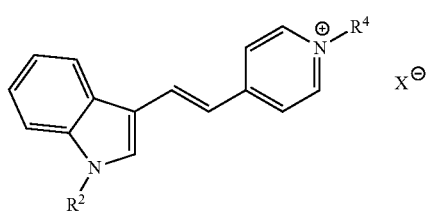

wherein X is an anion;

$R^2$ is hydrogen or $C_1$-$C_5$ alkyl; and $R^4$ is $C_1$-$C_5$ alkyl.

In certain embodiments, the AIEgen is selected from the group consisting of:

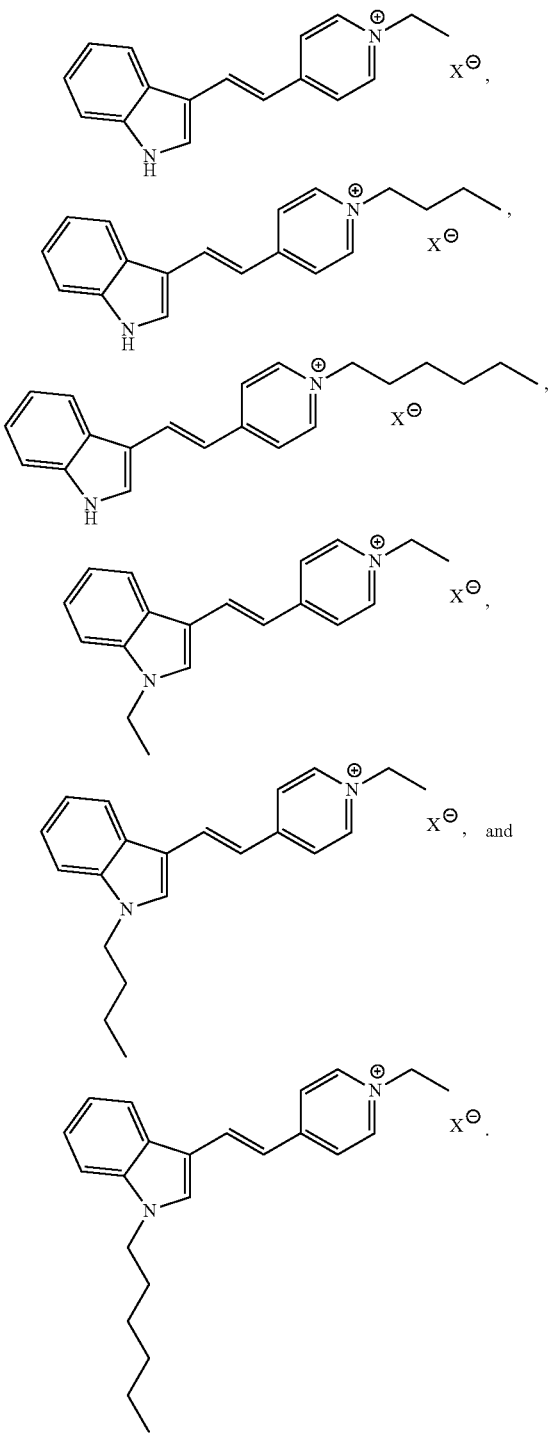

The AIEgen described herein can be readily prepared by a person of ordinary skill in the art using known methods. For example, the AIEgen can be prepared by a condensation reaction or a metal coupling reaction. In the examples below, the AIEgen are formed by condensing an appropriately modified indole-3-carboxaldehyde with a 1-alkyl-4-methyl pyridinium salt.

Also provided herein is a method of preparing an AIEgen of Formula 2, the method comprising: contacting a compound of Formula 4:

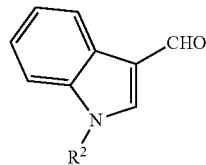

4 wherein $R^2$ is $C_1$-$C_5$ alkyl; with a compound of Formula 5:

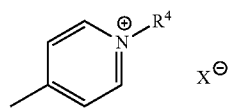

5 wherein X is an anion; and $R^4$ is $C_1$-$C_5$ alkyl; and a Brønsted base thereby forming the compound of Formula 2.

Any Brønsted base of suitable pKb can be used in the methods described herein including, but not limited to, NaOH, KOH, LiOH, triethyl amine, N,N-diisopropylethylamine, pyrrolidine, morpholine, pyridine, imidazole, and the like.

The reaction can be conducted in any polar protic or polar aprotic solvent. Exemplary solvents include, but are not limited to, alcohols, ethers, formamides, sulfoxides, aromatic solvents, halogenated solvents, and combinations thereof. In certain embodiments, the reaction is conducted in methanol, ethanol, isopropanol, dimethylformamide, dimethylsulfoxide, tetrahydrofuran, tetrahydropyran, dioxane, benzene, toluene, pyridine, dichloromethane, dichloroethane, and mixtures thereof.

In alternative embodiments, the compound of Formula 4 is contacted with the conjugate base of the compound of Formula 5 thereby forming the AIEgen of Formula 2. The conjugate base of the compound of Formula 5 can be prepared by the reaction of the compound of Formula 5 and a Brønsted base.

The present disclosure also provides a method for imaging a cell in a sample, the method comprising: contacting the sample with an AIEgen described herein; irradiating the cell with light; and detecting the fluorescence of the AIEgen.

The sample can be any suitable type known to potentially include cancer cells. Examples of suitable samples include, but are not necessarily limited to, biopsy material, resection material, urine, bladder washings, bladder scrubbings, blood, sputum, cerebrospinal fluid, pleural effusions, abdominal ascites, liver, thyroid, ovary, lymph node, breast, cervix, lung, biliary tree, pancreas, lung and colon. In certain embodiments, the sample is a fluid sample.

In certain embodiments, the cell is derived from an animal (e.g., a mammal), including, but not limited to, humans, non-human primates, canines, bovines, felines, and rodents. In certain embodiments, the cell is derived from a human cell.

In certain embodiments, the cell is a cancer cell. In certain embodiments, the cancer cell is a cancer cell of a cancer of the head, neck, eye, mouth, throat, esophagus, bronchus, larynx, pharynx, chest, bone, lung, colon, rectum, stomach, prostate, urinary bladder, uterine, cervix, breast, ovaries, testicles or other reproductive organs, skin, thyroid, blood, lymph nodes, kidney, liver, pancreas, and brain or central nervous system. In certain embodiments, the cancer is a lung cancer or a breast cancer.

The light used to irradiate the cell may have an excitation wavelength $\lambda_{ex}$ between 350-600 nm, 350-550 nm, 350-500 nm, 400-500 nm, 375-475 nm, or 400-450 nm.

Any instrument that can be used to irradiate cell with light that is capable of emitting light between 350-600 nm can be used in connection with the methods described herein. In certain embodiments, the instrument is a laser. In certain embodiments, confocal laser scanning microscopy is used to irradiate the cell and detect the fluorescence of the AIEgen.

The fluorescence may have an emission wavelength $\lambda_{em}$ between 450-700 nm, 450-650 nm, 450-600 nm, 475-575 nm, 500-600 nm, or 500-550 nm.

Detecting the presence of luminescence in the sample can be conducted by visual inspection and/or using a spectrometer. Any conventional spectrometer capable of measure absorbance of the sample, which can fall between about 450 to 700 nm, can be used in connection with the methods described herein. In certain embodiments, the spectrometer is a visible light spectrometer or an ultraviolet-visible light spectrometer that is capable of measuring absorbance of the test sample between 450-700 nm, 450-650 nm, 450-600 nm, 475-575 nm, 500-600 nm, or 500-550 nm.

The step of detecting the fluorescence of the AIEgen can also comprise monitoring the migration of the AIEgen from the mitochondrion to the nucleolus of the cell; and optionally determining the viability of the cell based on the migration of the AIEgen from the mitochondrion to the nucleolus. In certain embodiments, the cell is a cancer cell.

The methods described herein can be used to monitor the viability of a cancer cell in the presence of a test agent. The test agent can be any agent that is suspected of having a biological effect on cell (e.g., cell growth or cell cycle) including, but not limited to, small molecule, antibody, protein, interfering nucleic acid, or the like. In certain embodiments, the test agent is an agent suspected of having or known to have anti-cancer properties. The methods described herein can be used to monitor the effect of the anti-cancer agent on the viability of the cancer cell.

The present disclosure also provides a method of detecting a cancer cell in a sample suspected of containing the cancer cell, the method comprising: contacting the sample with an AIEgen described herein irradiating the sample with light; detecting the fluorescence of the AIEgen; and determining whether the sample comprises the cancer cell based on the detected fluorescence.

IVPI-2 is able to stain mitochondria in healthy live cancer cells. However, when $\Delta\psi_m$ decreases, IVPI-2 migrates into nucleolus. Since IVPI-2 is target-changeable according to the change of mitochondrial physiology, the chemical structure of IVPI-2 was modified in order to enhance the mitochondria to nucleolus migration. Iodide ion is a well-known effective fluorescent quencher due to its heavy-atom effect. Consequently, iodide ion was replaced by hexafluorophosphate and IVP-02 was obtained shown in FIG. 1. The quantum yield of IVP-02 in the solid state is 4.3%, which is about 3 times than that of IVPI-02 (1.3%). An Exemplary synthetic route to certain embodiments of the compounds described herein is depicted in Scheme 1.

Scheme 1. Synthesis routes of IVP-02, 04, 06, 22, 42, and 62.

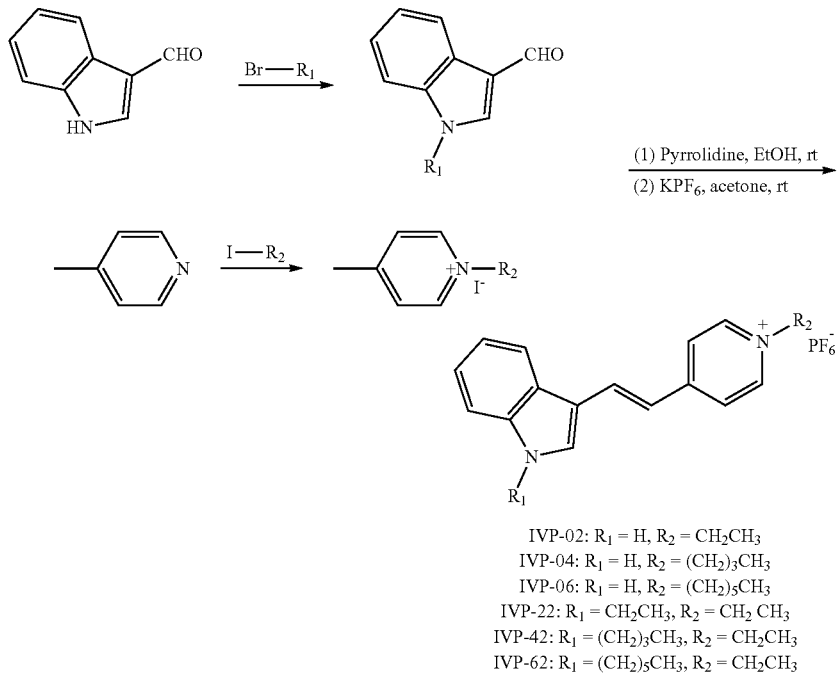

IVP-02: R₁ = H, R₂ = CH₂CH₃
IVP-04: R₁ = H, R₂ = (CH₂)₃CH₃
IVP-06: R₁ = H, R₂ = (CH₂)₅CH₃
IVP-22: R₁ = CH₂CH₃, R₂ = CH₂CH₃
IVP-42: R₁ = (CH₂)₃CH₃, R₂ = CH₂CH₃
IVP-62: R₁ = (CH₂)₅CH₃, R₂ = CH₂CH₃

The chemical structure of IVP-02 was fully characterized by $^1$H NMR, $^{13}$C NMR, $^{19}$F NMR and HRMS. In addition, the structure of IVP-02 was further confirmed by single-crystal X-ray diffraction analysis (CCDC 1986367, FIG. 1).

Figure 2:
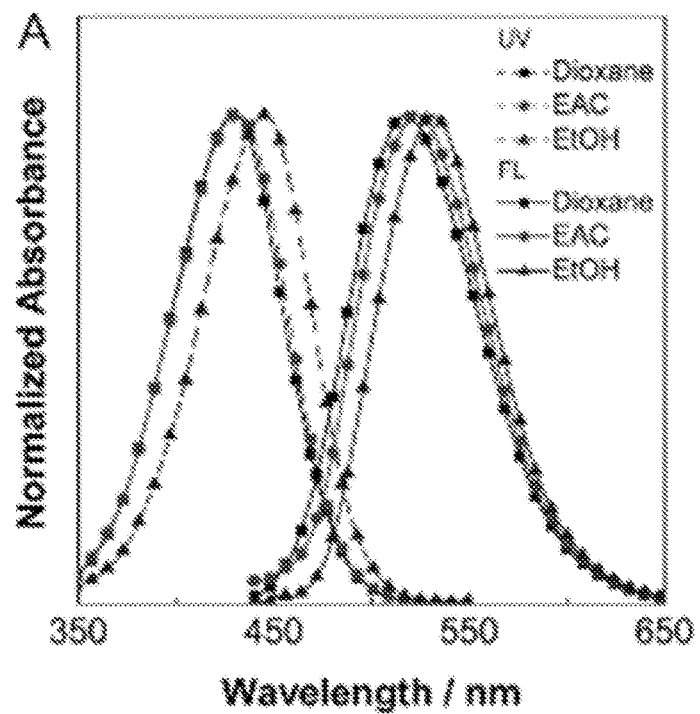
FIG. 2 (A) Normalized UV (dashed line) and FL (solid line) spectra of IVP-02 in different solvents. (B) FL spectra of IVP-02 in $H_2O$ and $H_2O$/glycerol mixtures with different glycerol fractions ($f_{Gly}$). (C) Changes in the FL peak intensities (I) of the solutions of IVP-02 with the glycerol contents in the $H_2O$/glycerol mixtures. $I_0$ is the intensity in pure $H_2O$. (D) FL spectra of IVP-02 in $H_2O$/glycerol mixture with 90% glycerol at 25 and −20° C. (E) FL spectrum of IVP-02 in solid state. $\lambda_{ex}$=440 nm. Inset: Fluorescent photo of IVP-02 solid taken under 365 nm UV irradiation from a handheld UV lamp. (F) TPEF spectra of ECPI-12 in DMSO excited by 780, 800, 820, 840, 860, 880, and 900 nm, respectively. Concentration: 10 μM. The top view (G) and side view (H) of the crystal structure of IVP-02.
Figure 2:
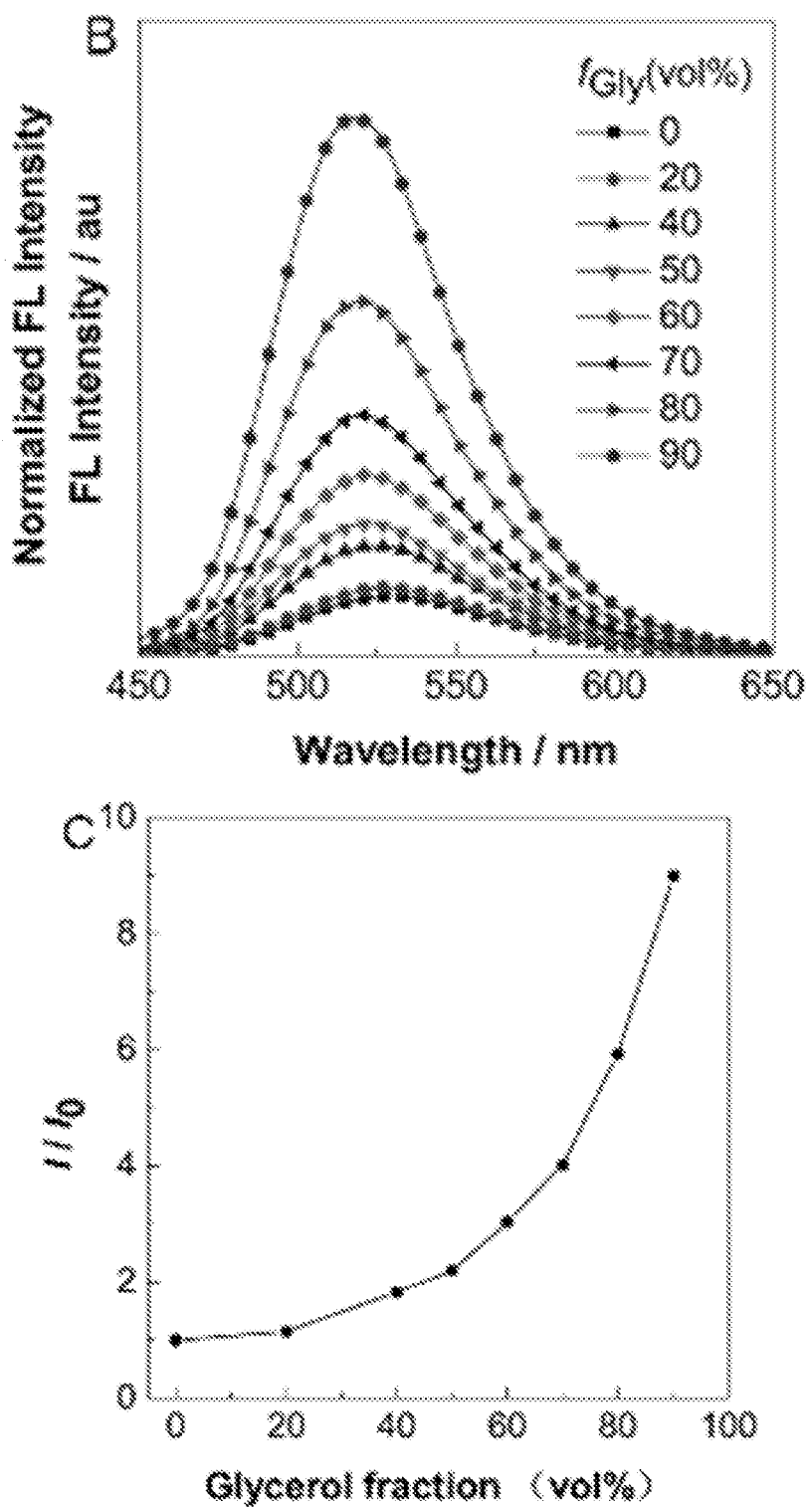
Figure 2:
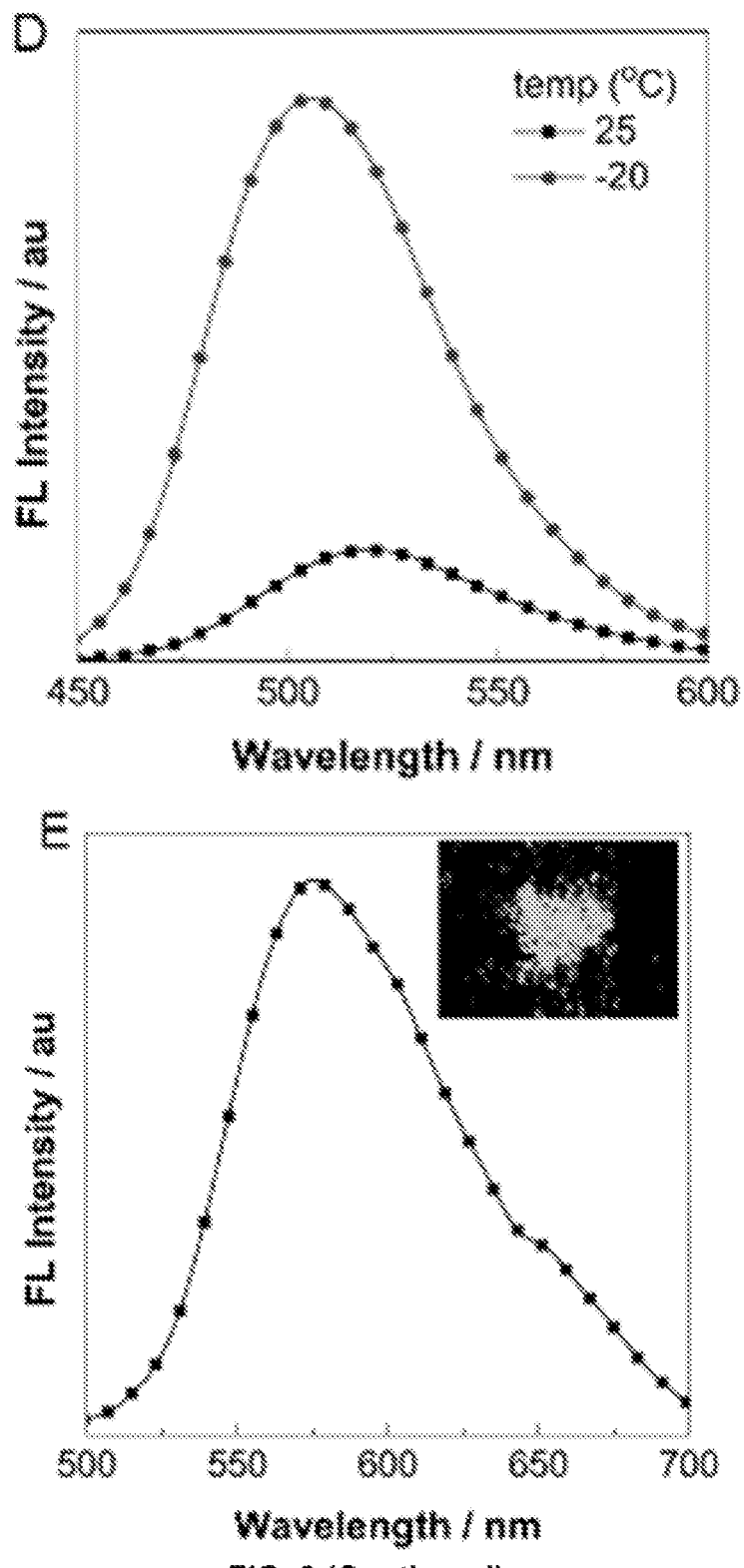
Figure 2:
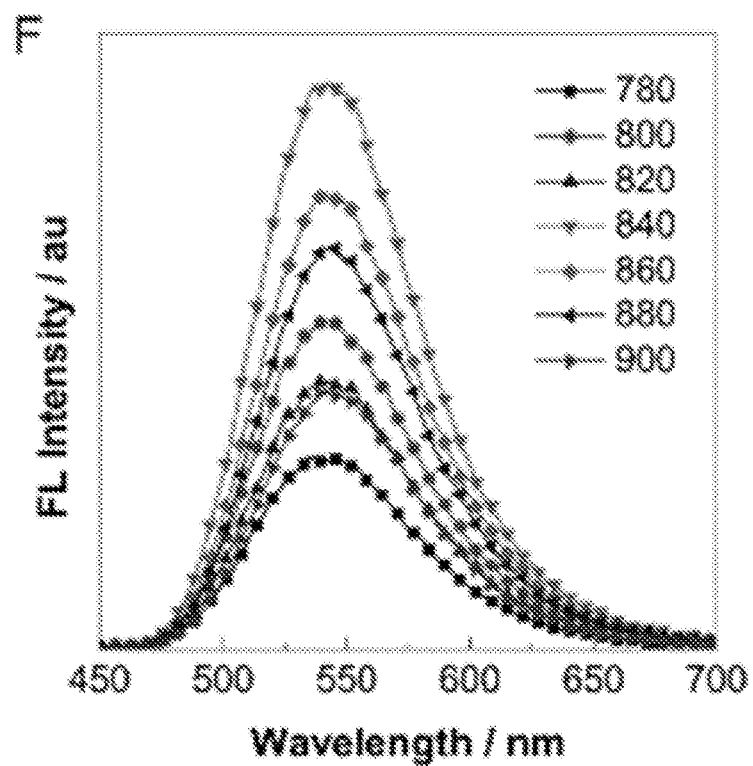
Figure 2:
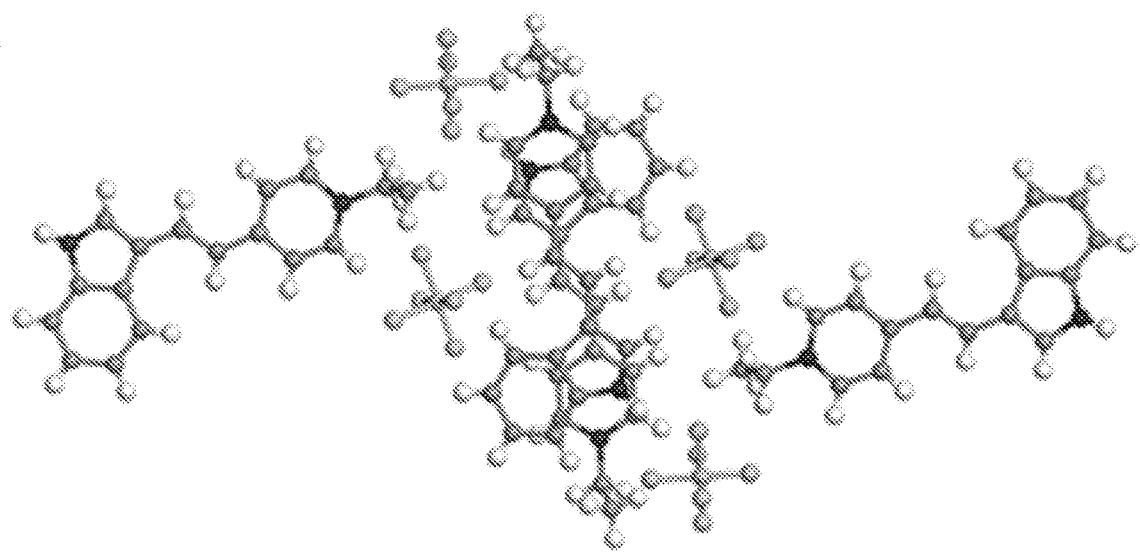
Figure 2:
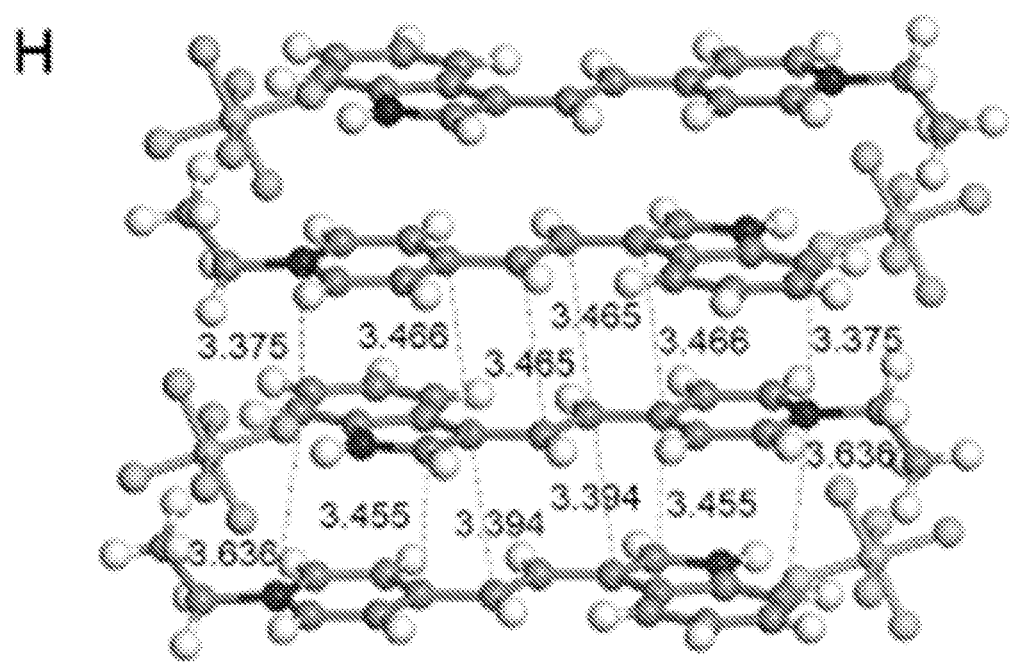
Figure 3:
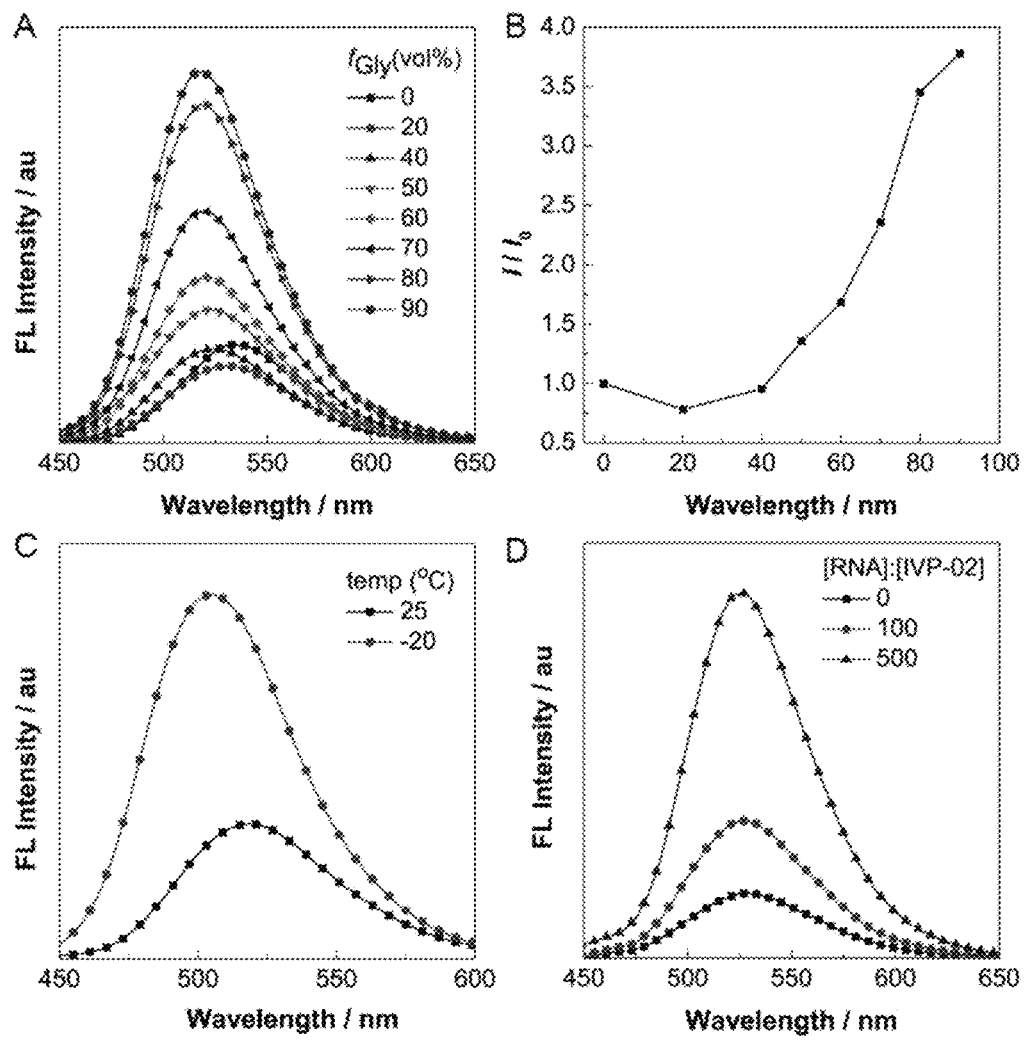
FIG. 3 (A) FL spectra of IVP-02 in MeOH and MeOH/glycerol mixtures with different glycerol fractions ($f_{Gly}$). (B) Changes in the FL peak intensities (I) of the solutions of IVP-02 with the glycerol contents in the MeOH/glycerol mixtures. $I_0$ is the intensity in pure MeOH. (C) FL spectra of IVP-02 in MeOH/glycerol mixture with 90% glycerol at 25 and −20° C. Concentration: 10 μM. (D) FL spectra of IVP-02 (5 μM) in PBS with different RNA concentrations.

The absorption and one-photon excited fluorescence (FL) spectra of IVP-02 in different solvents were shown in FIG. 2A. IVP-02 showed strong absorbance from 400 to 450 nm, and intense emission from 500 to 550 nm. IVP-02 possesses distinct donor-π-accepter structure. It showed bathochromic shift in FL spectra with the increase of solvent polarity, due to intramolecular charge transfer effect. Addition of THF and EtOH to the solution of IVP-02 in water failed to make the dye molecules aggregate probably due to its amphiphilic nature. Similar results were reported by others. Then the emission of IVP-02 in the increasing viscosity environment and in solid state was carefully measured to study whether IVP-02 possessed AIE activity. In FIGS. 2B and 2C, IVP-02 showed weak emission in pure water solution. With the increase of glycerol volume content accompanied by viscosity increasing, the FL intensity increased gradually. In addition to water/glycerol system, similar experiments were carried out in MeOH/glycerol system in FIGS. 3A and B. The results also showed that IVP-02 was highly emissive in high viscosity environment. Moreover, when the solution temperature decreased from 25° C. to −20° C., the FL intensity also enhanced obviously in FIGS. 2D and 3C. These phenomena occur because high viscosity and low temperature could hamper intramolecular motion, leading to the closure of the nonradiative decay channel and thus enhanced FL emission. Furthermore, we added some RNA in PBS solution of IVP-02. IVP-02 showed weak emission in PBS solution, but with the increase of RNA concentration, the FL intensity enhanced obviously in FIG. 3D. Based on the calculation results in FIG. 2O, IVP-02 located in the minor grooves of RNA, where the intramolecular motion of IVP-02 was also hampered. These results indicated that the restriction of intramolecular motion (RIM) is the main reason that makes the dye highly emissive, which is also the luminescence mechanism of AIEgens. IVP-02 also exhibited strong fluorescence around 575 nm in the solid state and its powder emitted bright yellow light (FIG. 2E). Therefore, based on the above results, IVP-02 possesses AIE activity.

IVP-02 shows weak emissions in aqueous solution, but emits strong fluorescence in high-viscosity conditions, thus it is greatly favorable for wash-free bioimaging. In addition, IVP-02 emits redder fluorescence in solid state than that in solution. To testify the mechanism of the red shift in solid state of IVP-02, its crystal has been analyzed in FIGS. 2G and 2H. The molecules of IVP-02 are anti-parallelly stacked and form multimers in the crystalline state. The short intermolecular stacking distances of the multimers are 3.636 Å, 3.455 Å, 3.394 Å, 3.375 Å, 3.466 Å, and 3.465 Å, indicating strong intermolecular interactions inside the multimers. So the red-shift emission in solid state should be attributed to the intermolecular π-π interactions induced by the short contact between the molecules. Generally, organic dyes with donor-acceptor structure exhibit good two-photon absorption (TPA) and two-photon excited fluorescence (TPEF). The TPEF spectra of IVP-02 excited at different pulse wavelengths (780-900 nm) in DMSO were measured in FIG. 2F. Using fluorescein as the standard, the two-photon absorption cross section (δ) of IVP-02 was calculated and shown in Table 1. The highest δ was 287 GM excited at 800 nm. Such high δ value is beneficial for two-photon imaging in live cells and deep tissues.

TABLE 1

Two-photon absorption cross section (δ) of IVP-02 in DMSO.

| $\lambda_{ex}$/nm | 780 | 800 | 820 | 840 | 860 | 880 | 900 |
|---|---|---|---|---|---|---|---|
| δ/GM | 106 | 287 | 173 | 194 | 271 | 227 | 78 |

Figure 4:
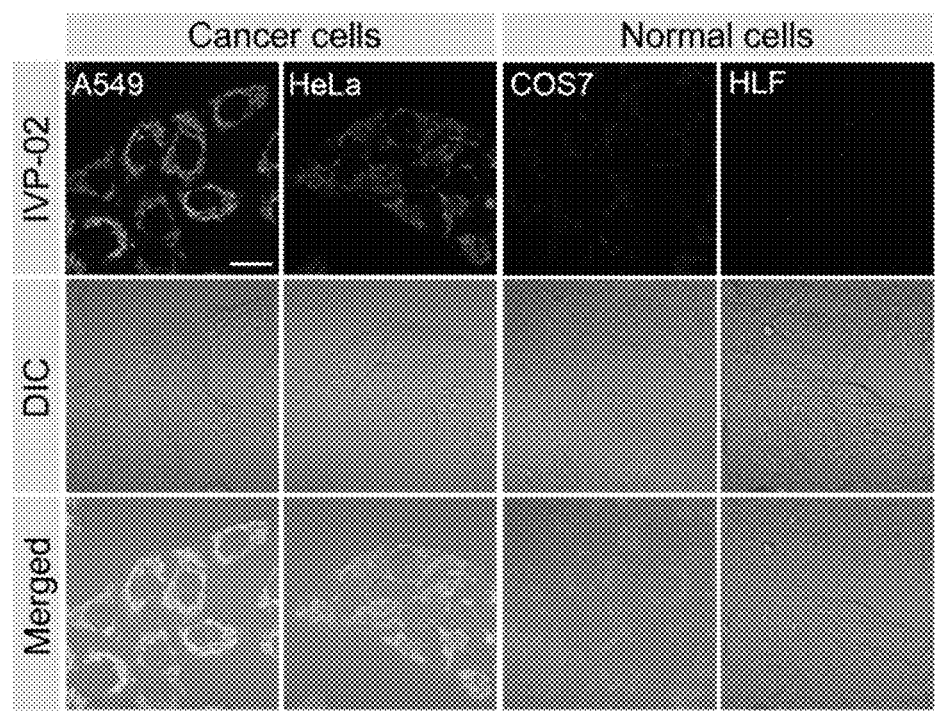
FIG. 4 CLSM images of live cancer cells (A549 and HeLa) and normal cells (COS7 and HLF) stained with 2 μM IVP-02 for 30 min, respectively. $\lambda_{ex}$=488 nm, $\lambda_{em}$=500-650 nm. Scale bar=20 μm.
Figure 5:
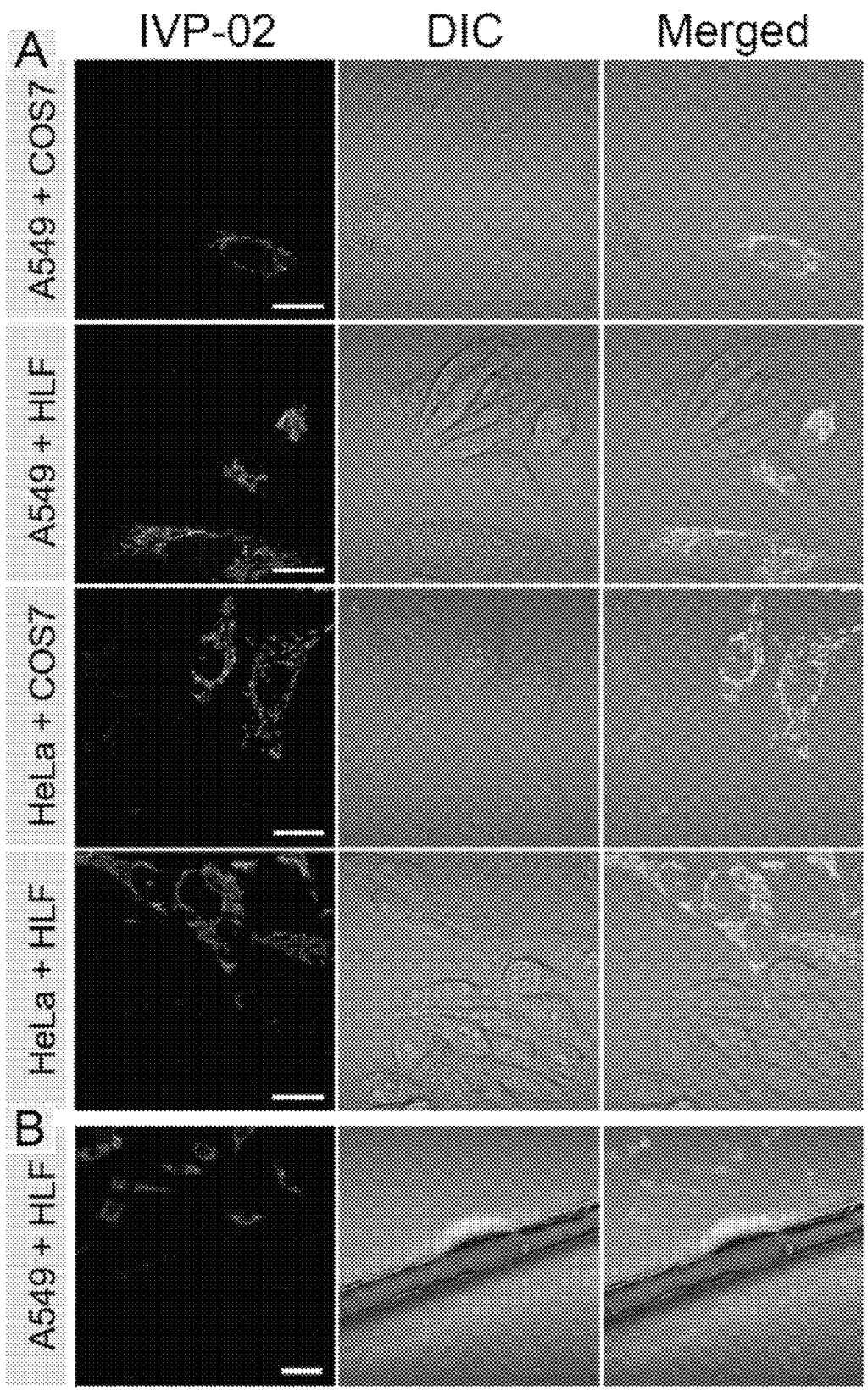
FIG. 5 CLSM images of live cancer cells (A549 and HeLa) co-cultured with normal cells (COS7 and HLF) (A), and the images of A549 and HLF cells seeded on different cover glasses (Scale bar=20 μm) (B) stained with 2 μM IVP-02 for 30 min (Scale bar=50 μm), respectively. $\lambda_{ex}$=488 nm, $\lambda_{em}$=500-650 nm.

The bioimaging properties of IVP-02 in live cells were investigated by confocal laser scanning microscopy (CLSM). Cancer cells (A549 and HeLa) and normal cells (COS7 and HLF) were stained with IVP-02, respectively. In FIG. 4, the fluorescence intensity in normal cells was much weaker than that in cancer cells under the same staining and imaging conditions. So IVP-02 holds the high potential to differentiate cancer and normal cells. To verify this speculation, cancer and normal cells were co-cultured and stained with IVP-02. In FIG. 5A, it could be seen that only cancer cells (A549 and HeLa) were highly illuminated, while normal cells (COS7 and HLF) almost showed no fluorescence. To precisely confirm the selectivity of IVP-02 to cancer cells, cancer cells A549 and normal cells HLF (A549 and HLF are both human lung cells) were seeded on different cover glasses, respectively. Then the two cover glasses were put in the same dish and stained with IVP-02 at the same time. In FIG. 5B, only A549 cells on the upper cover glass were illuminated, while HLF cells on the lower glass were not illuminated. The imaging results indicate that IVP-02 can selectively differentiate cancer from normal cells.

Figure 6:
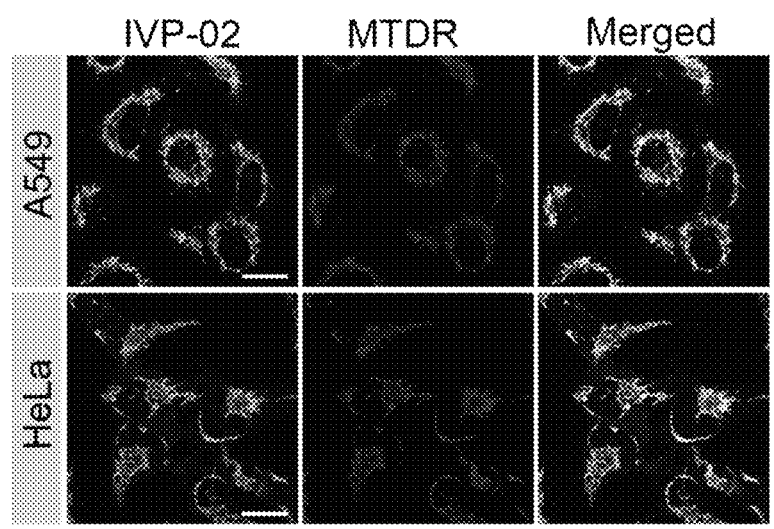
FIG. 6 CLSM images of live HeLa and A549 cells stained with 2 μM IVP-02 and 0.2 μM MTDR, respectively. IVP-02: $\lambda_{ex}$=488 nm, $\lambda_{em}$=500-650 nm; MTDR: $\lambda_{ex}$=640 nm, $\lambda_{em}$=650-700 nm. Scale bar=20 μm.

In the above pictures, filamentous structures in cytoplasm of cancer cells were observed, which were typical morphology of mitochondria. Then co-stain experiments with commercial mitochondrial probe MitoTracker™ Deep Red FM (MTDR) were carried out (FIG. 6). The co-localization coefficient of IVP-02 and MTDR was around 0.9, demonstrating the localization of IVP-02 in mitochondria in cancer cells.

Without wishing to be bound by theory, it is believed that IVP-02 is able to selectively stain cancer cells over normal cells, based in part due to the higher $\Delta\psi_m$ of cancer cells as compared to normal cells. However, certain commercial mitochondrial probes that are also sensitive to $\Delta\psi_m$, can stain both cancer and normal cells. So, $\Delta\psi_m$ is likely not the only parameter that allows the compounds described herein to distinguish cancer and normal cells. The chemical structure of the dye itself likely also plays an important role.

Figure 7:
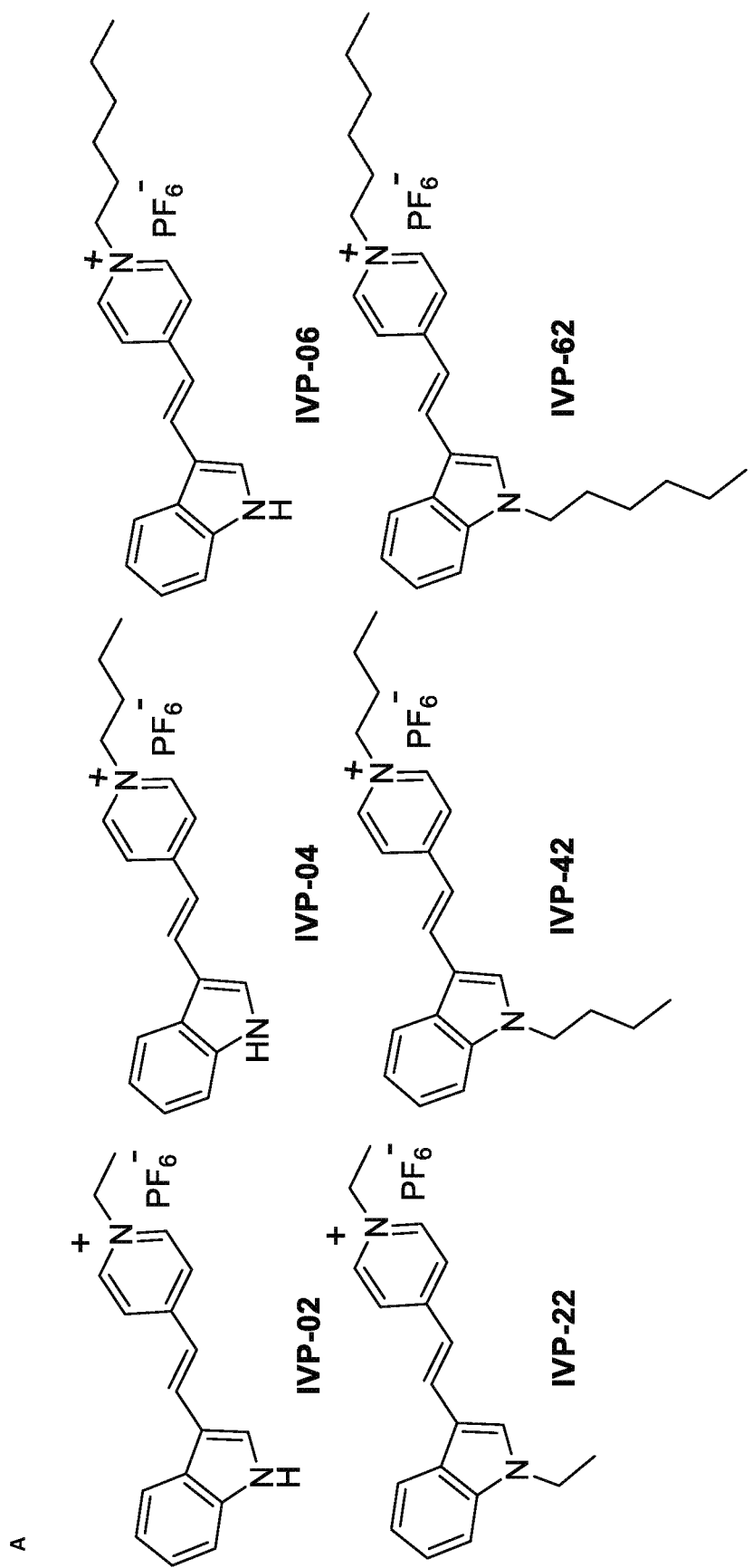
FIG. 7. (A) Chemical structures of IVP-02, 04, 06, 22, 42, and 62. (B) CLSM images of live A549 cells with stained 2 μM IVP-04, 06, 22, 42, and 62 for 30 min, respectively. $\lambda_{ex}$=488 nm, $\lambda_{em}$=500-650 nm. (C) CLSM images of A549 cells stained with 2 μM IVP-04, 06, 22, 42, 62, and 0.2 μM MTDR, respectively. IVP-04, 06, 22, 42, and 62: $\lambda_{ex}$=488 nm, $\lambda_{em}$=500-650 nm; MTDR: $\lambda_{ex}$=640 nm, $\lambda_{em}$=650-700 nm. Scale bar=20 μm.
Figure 7:
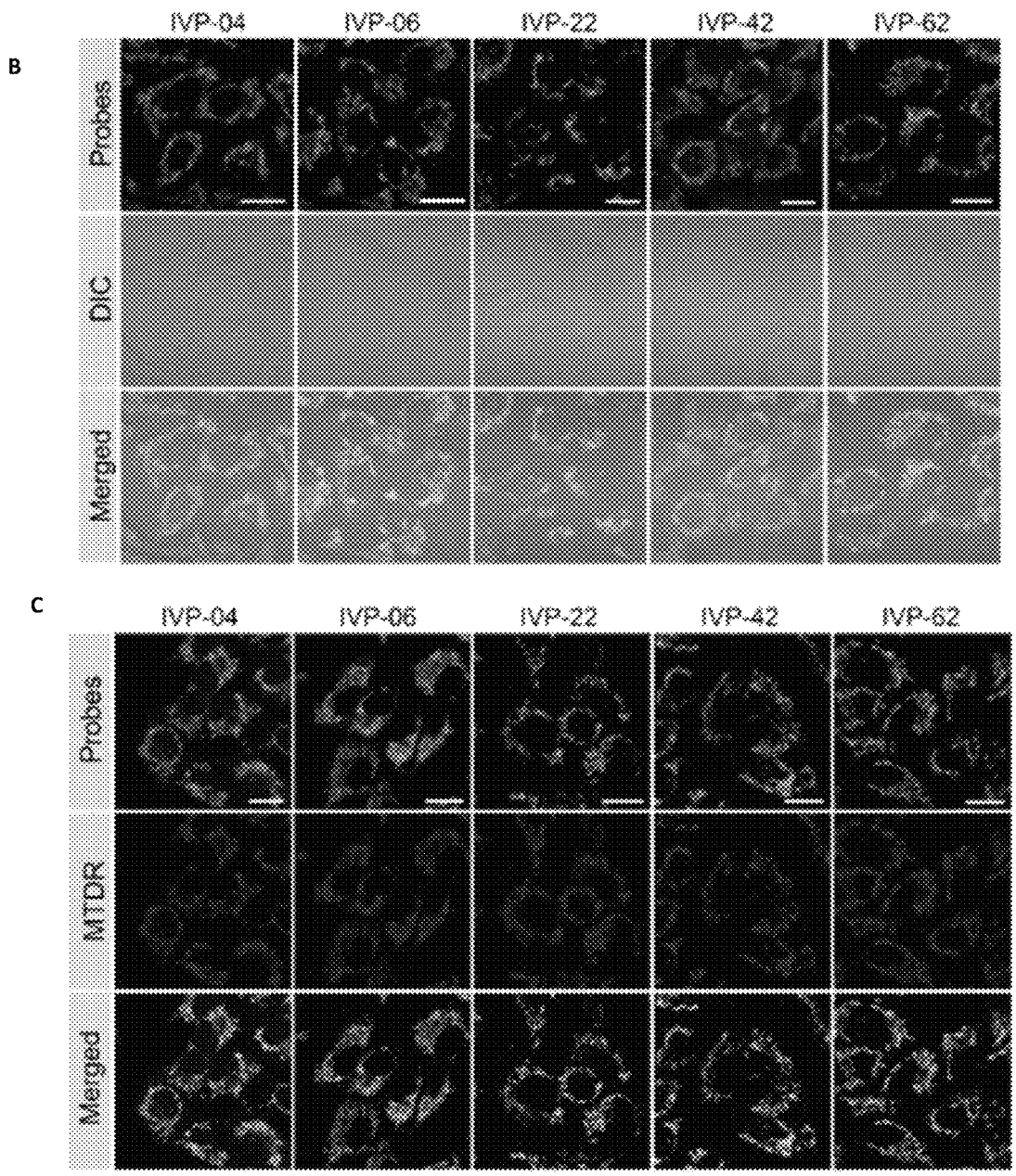
Figure 8:
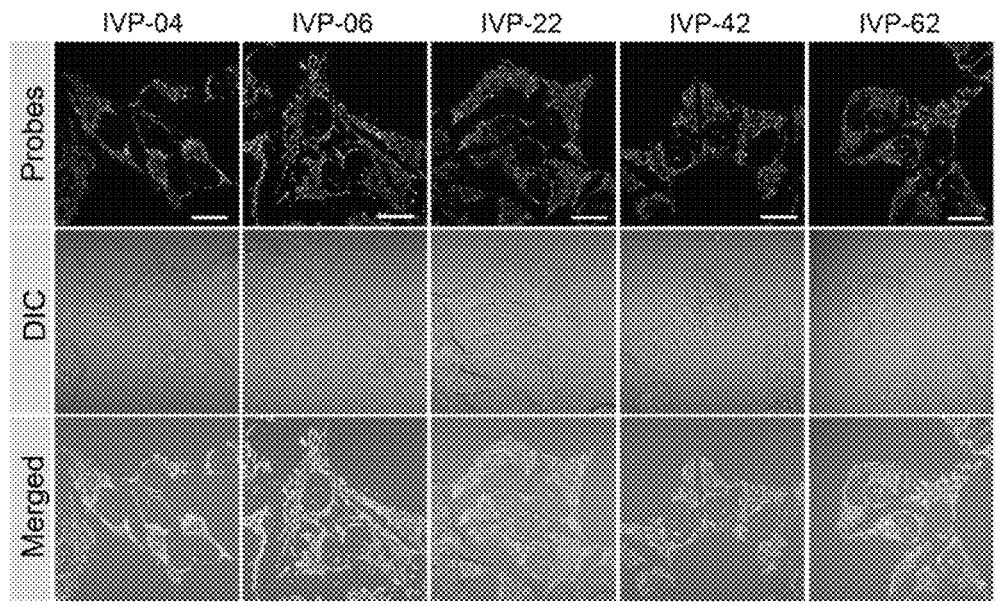
FIG. 8 CLSM images of live HeLa cells with stained 2 μM IVP-04, 06, 22, 42, and 62 for 30 min, respectively. $\lambda_{ex}$=488 nm, $\lambda_{em}$=500-650 nm. Scale bar=20 μm.
Figure 9:
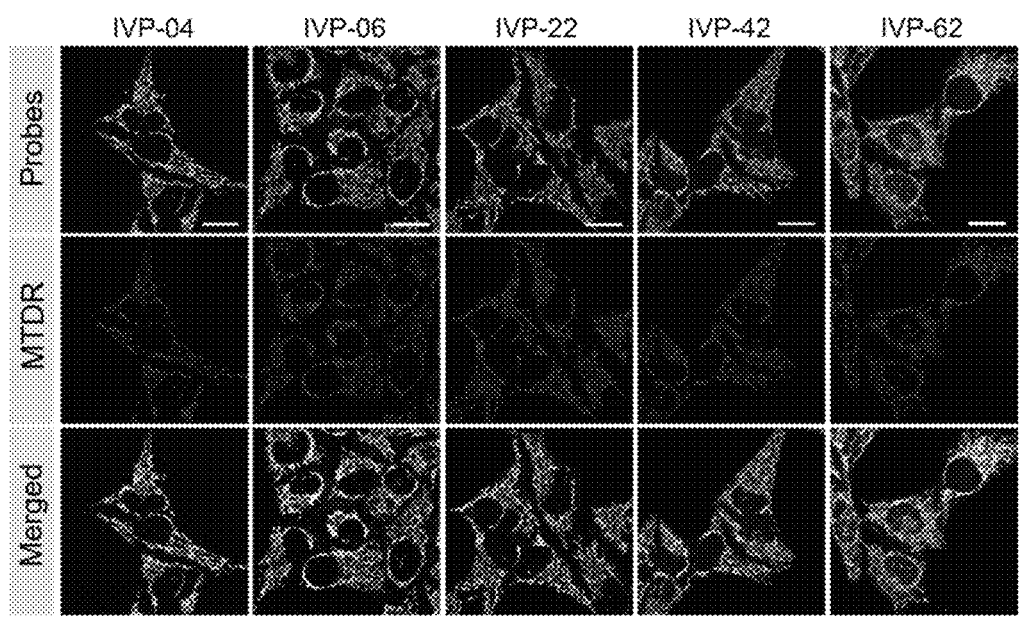
FIG. 9 CLSM images of HeLa cells stained with 2 μM IVP-04, 06, 22, 42, 62, and 0.2 μM MTDR, respectively. IVP-04, 06, 22, 42, and 62: $\lambda_{ex}$=488 nm, $\lambda_{em}$=500-650 nm; MTDR: $\lambda_{ex}$=640 nm, $\lambda_{em}$=650-700 nm. Scale bar=20 μm.

It was speculated that the membrane permeability of the probe was a key factor for its selectivity to cancer cells, since the plasma membrane of cancer cells was reported to be more permeable than normal cells. Consequently, IVP-02 was modified by lengthening the alkyl chain at the pyridine salt side and indole side, respectively, to tune the membrane permeability. Five new molecules IVP-04, IVP-06, IVP-22, IVP-42, and IVP-62 were obtained as shown in FIG. 7A. The synthetic route to these new IVP molecules is depicted in Scheme 1. Their chemical structures were fully characterized by $^1$H NMR, $^{13}$C NMR, and $^{19}$F NMR. Then cancer cells A549 were stained with the five new molecules, respectively. In FIG. 7B, the fluorescence pattern showed that all these molecules stained mitochondria. The co-stain experiments with MTDR also confirmed their location in mitochondria in A549 cells in FIG. 7C. In addition to A549 cells, the same experiments were also carried in HeLa cells (FIGS. 8 and 9). The results were similar with that in A549 cells, which demonstrates that IVP-04, 06, 22, 42, and 62 can selectively stain mitochondria in cancer cells.

Figure 10:
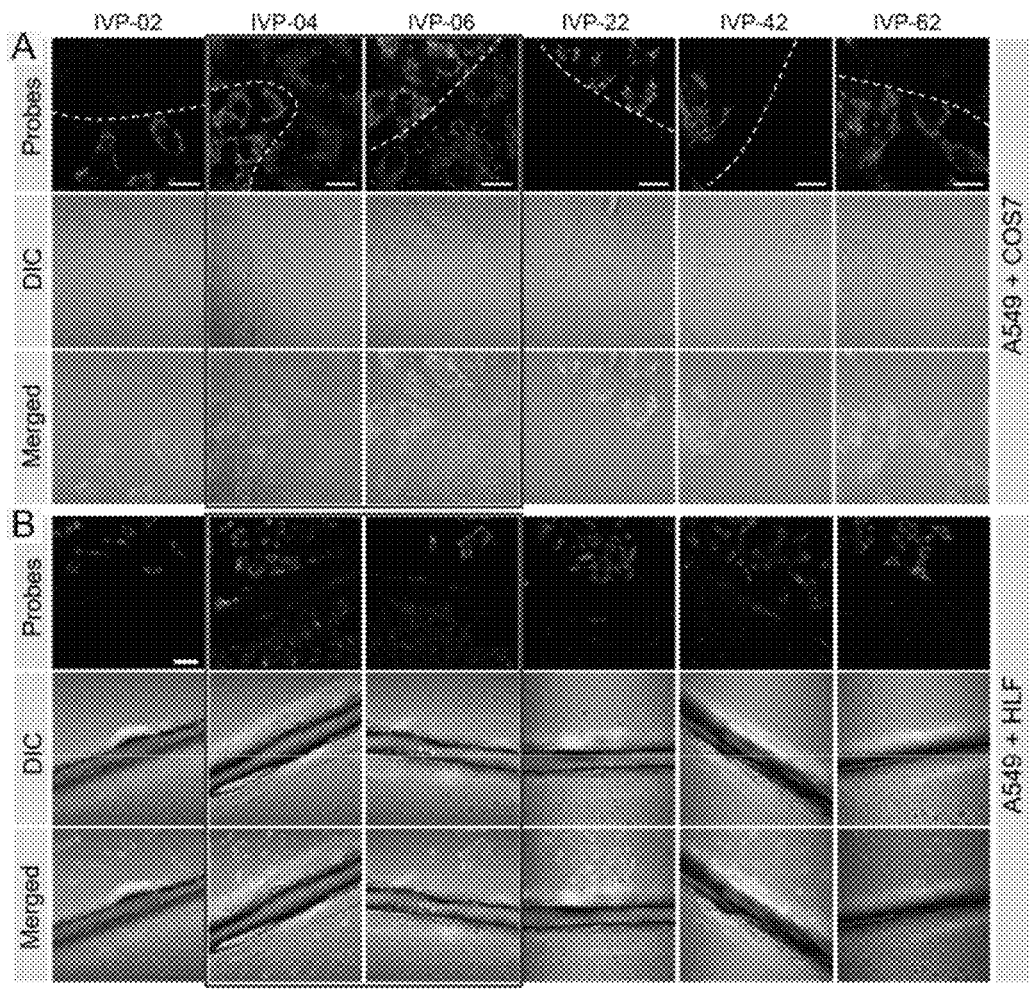
FIG. 10 CLSM images of live cancer cells (A549) co-cultured with normal cells (COS7) (A), and the images of A549 and HLF cells seeded on different cover glasses Scale bar=20 μm (B) stained with 2 μM IVP-02, 04, 06, 22, 42, and 62 for 30 min Scale bar=50 μm, respectively. (The first column in B is the same as FIG. 3B) $\lambda_{ex}$=488 nm, $\lambda_{em}$=500-650 nm.
Figure 11:
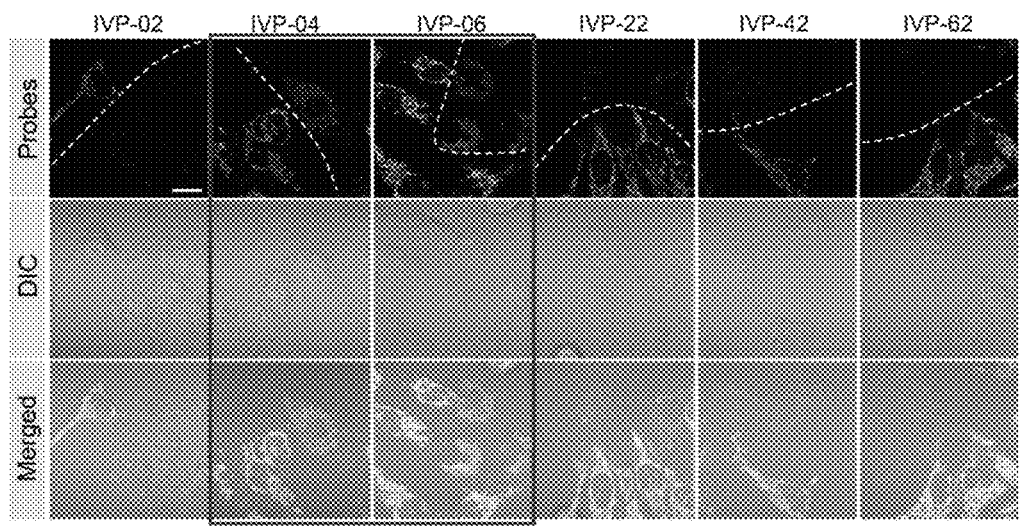
FIG. 11 CLSM images of live cancer cells (HeLa) co-cultured with normal cells (COS7), stained with 2 μM IVP-02, 04, 06, 22, 42, and 62 for 30 min, respectively. $\lambda_{ex}$=488 nm, $\lambda_{em}$=500-650 nm. Scale bar=20 μm.
Figure 12:
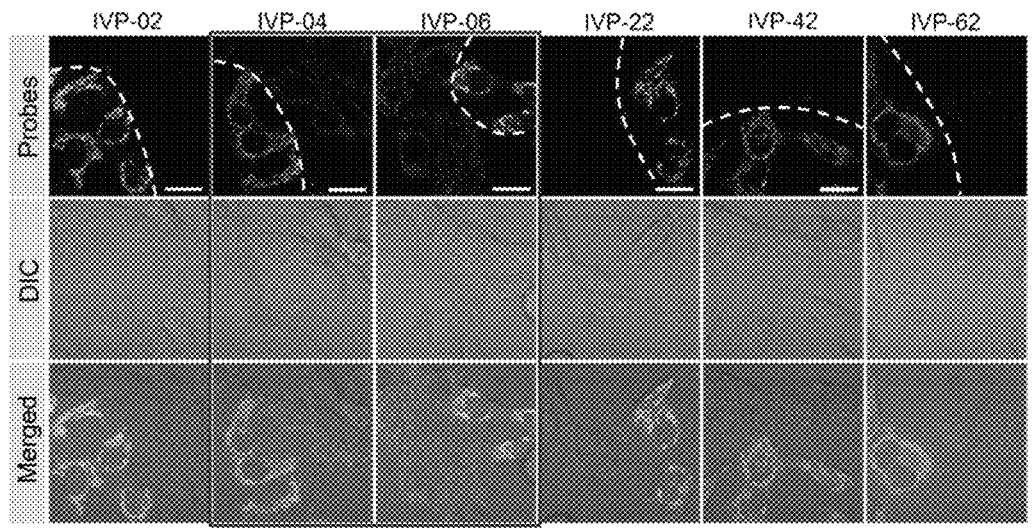
FIG. 12 CLSM images of live cancer cells (A549) co-cultured with normal cells (HLF), stained with 2 μM IVP-02, 04, 06, 22, 42, and 62 for 30 min, respectively. $\lambda_{ex}$=488 nm, $\lambda_{em}$=500-650 nm. Scale bar=20 μm.

Cancer cells A549 co-cultured with normal cells COS7 were stained with these molecules, respectively. In FIG. 10A, IVP-02, 22, 42, and 62 only stain A549 cells indicating that they can distinctly differentiate cancer and normal cells. Intriguingly, IVP-04 and 06 can stain both A549 and COS7 cells, which means that they cannot distinguish cancer and normal cells. Then HeLa cells co-cultured with COS7 cells (FIG. 11), and A549 cells co-cultured with HLF cells (FIG. 12) were also stained with these molecules, the results were similar with that in A549 cells co-cultured with COS7 cells. In addition to co-culturing, A549 cells and HLF cells were also seeded on different cover glasses and stained with these molecules. The imaging results (FIG. 10B) were also similar with the co-culturing results that IVP-04 and IVP-06 could stain both A549 and HLF cells, while the other four molecules only stain A549 cells. Based on the imaging results above, it can be concluded that the selectivity of these IVP molecules to cancer cells is also based on the length of alkyl chain at pyridinium salt side. Lengthening the alkyl chain at the pyridinium salt side will eliminate the selectivity to cancer cells.

Figure 13:
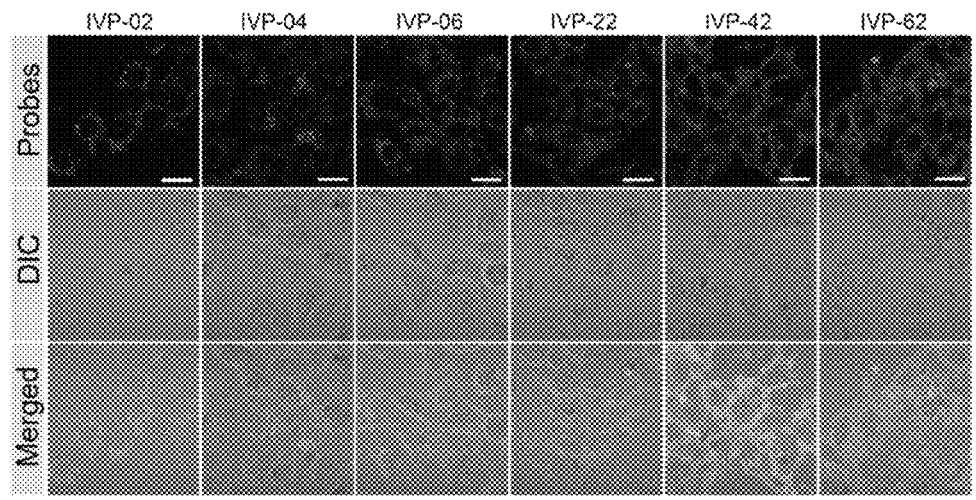
FIG. 13 CLSM images of live A549 cells stained with 2 μM IVP-02, 04, 06, 22, 42, and 62 at 4° C. for 20 min, respectively. $\lambda_{ex}$=488 nm, $\lambda_{em}$=500-650 nm. Scale bar=20 μm.
Figure 14:
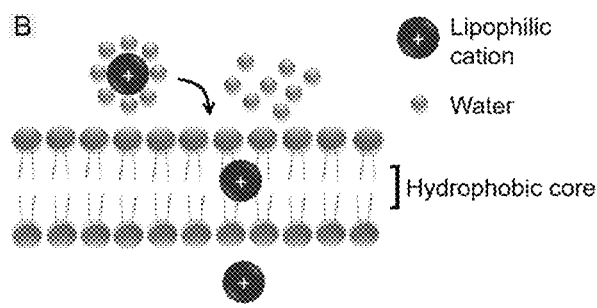
FIG. 14 (A) Equation of Born energy. (B) Schematic diagram of a lipophilic cation passing through the membrane.

The mechanism of cell entry of the IVP molecules was investigated. Cancer cells A549 were incubated with the IVP molecules at 4° C. for 20 min. In FIG. 13, at low temperature, obvious fluorescent signals inside the cells could still be observed. This result indicated that the IVP molecules entered the cell by diffusion. In some reported works, researchers found that lipophilic cations have an unusual property of being relatively lipid-soluble, despite their net positive charge. The energy demand for moving a lipophilic cation from an aqueous environment to the non-polar lipid interior of the membrane is far lower than that of moving a hydrophilic cation. The activation energy for the movement from the aqueous medium to the hydrophobic core of membrane is mainly from electrostatic interactions. The main electrostatic energy component, Born energy ($W_B$, FIG. 14A) is due to enthalpy input required to remove water molecules from the cation upon transfer from the aqueous environment to the lipid core of the membrane. With lower $W_B$, the lipophilic cation can pass through the membrane more easily. The Born energy is given by the equation in FIG. 14A, in which Z is the cation charge and r is the ionic radius. From the equation, $W_B$ is inversely proportional to the ionic radius. For these IVP molecules, ionic radius is the average distance from the molecule charge to water molecules around. FIG. 14B is a schematic diagram of a lipophilic cation passing through the membrane. Removing water molecules around the lipophilic cation is the first step. For lipophilic cation, the larger the ionic radius, the weaker interaction between the cation and water molecule, the lower $W_B$; as a result, the molecule more easily passes through the membrane.

Back to the chemical structures of these IVP molecules, pyridinium side of all these molecules is positively charged. This side is more hydrophilic, meaning that more water molecules are enriched at this side, so this side determines the ionic radius. Moreover, the similarity of IVP-02, 22, 42, and 62 at pyridinium side is the 2-carbon alkyl chain. The difference between IVP-02, 22, 42, 62 and IVP-04,06 at pyridinium side is the length of alkyl chain. IVP-04 and 06 have longer alkyl chain at pyridinium side, so that their ionic radius is larger than that of IVP-02, 22, 42, 62, implying that the interaction between the IVP-04, 06 and water molecules is weaker. So the Born energy values of IVP-04, 06 are lower than that of IVP-02, 22, 42, 62. As such, they pass through the membrane more easily. When staining normal cells, IVP-04, 06 are easier to penetrate cytomembrane than IVP-02, 22, 42, 62.

Figure 15:
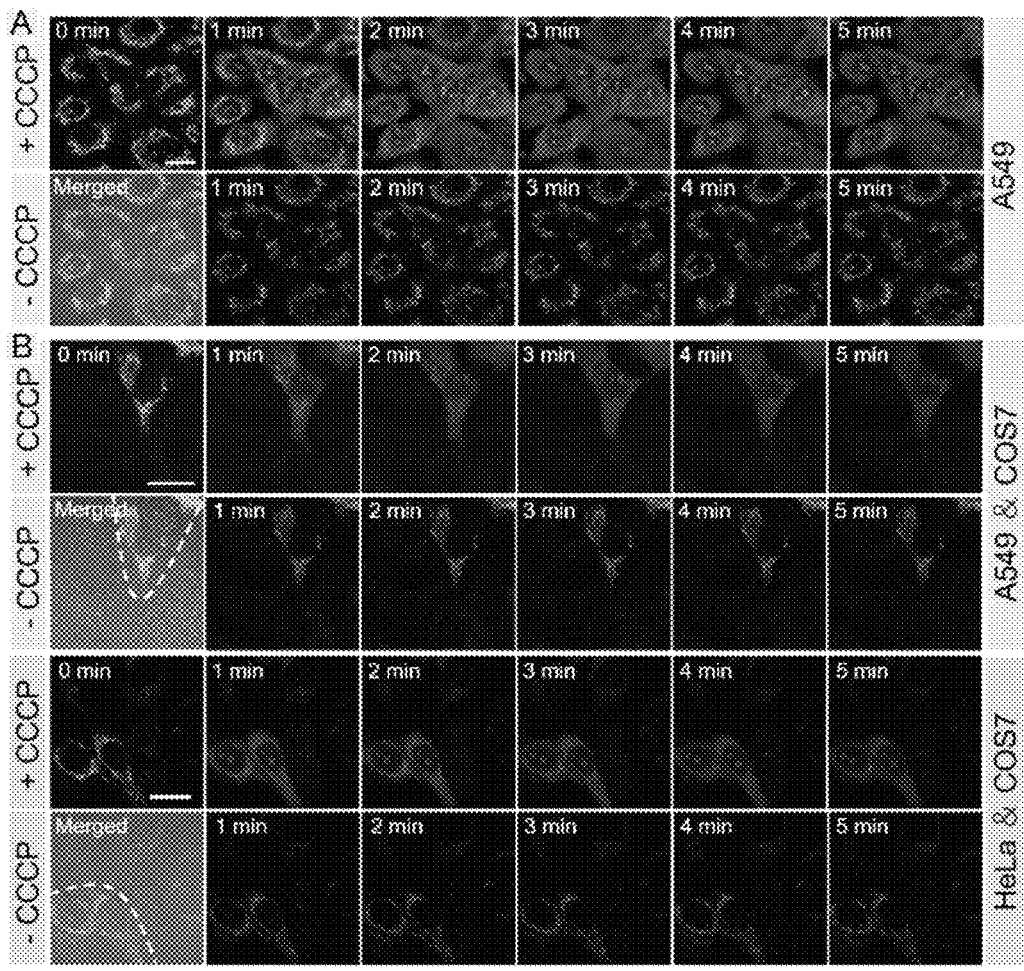
FIG. 15 Live A549 cells (A) and live A549 co-cultured with COS 7 cells, live HeLa co-cultured with COS7 cells (B) were pre-stained with 2 μM IVP-02 for 30 min, and treated with 20 μM CCCP for 5 min. Then CCCP was removed away and fresh culture medium was added for another 5 min. $\lambda_{ex}$=488 nm, $\lambda_{em}$=500-650 nm. Scale bar=20 μm.
Figure 16:
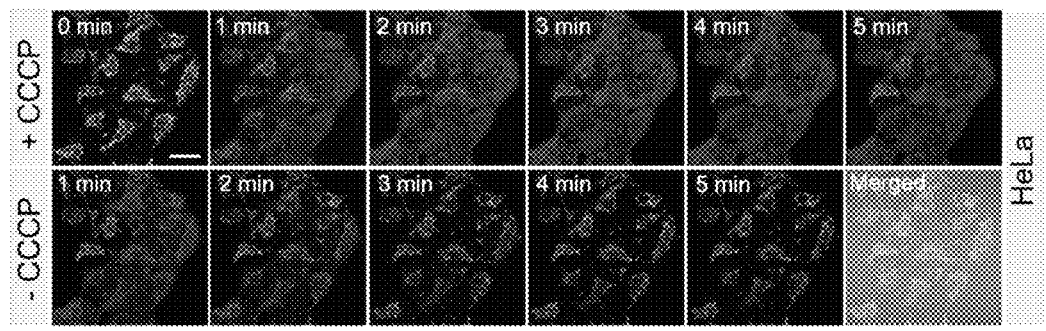
FIG. 16 Live HeLa cells were pre-stained with 2 μM IVP-02 for 30 min, and treated with 20 μM CCCP for 5 min. Then CCCP was removed away and fresh culture medium was added for another 5 min. $\lambda_{ex}$=488 nm, $\lambda_{em}$=500-650 nm. Scale bar=20 μm.
Figure 17:
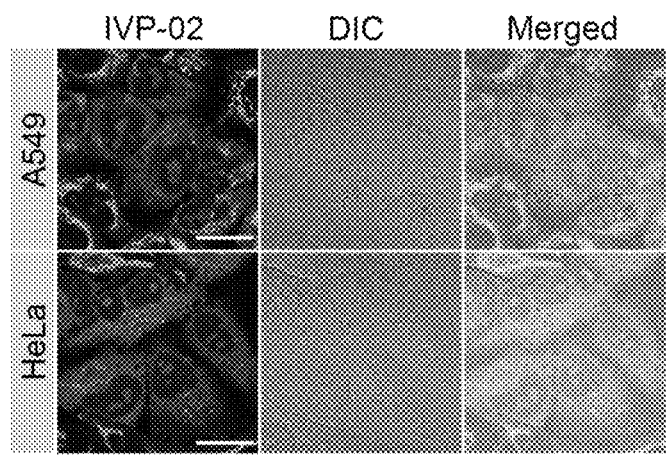
FIG. 17 Live A549 and HeLa cells were pre-stained with 2 μM IVP-02 for 30 min, and treated with 10 mM $H_2O_2$ for 10 min. $\lambda_{ex}$=488 nm, $\lambda_{em}$=500-650 nm. Scale bar=20 μm.

Monitoring cell viability is a highly valuable task for the fundamental researches in biology, pathology, and medicine. Then we investigated whether IVP-02 could monitor cell viability. $\Delta\psi_m$ is a very important indicator to characterize cell viability. With the loss of cell viability, $\Delta\psi_m$ would decrease, while with the recovery of cell viability, $\Delta\psi_m$ would also recover to the normal level. Hence visualizing the change of $\Delta\psi_m$ is an effective way to monitor cell viability. Carbonyl cyanide m-chlorophenyl hydrazone (CCCP) is a type of protonophore and can cause rapid acidification of mitochondria by collapsing $\Delta\psi_m$. Cancer cells A549 were pre-stained with IVP-02 for 30 min. In FIG. 15A, in the beginning, IVP-02 stained mitochondria clearly. With the addition of CCCP, the fluorescence intensity in mitochondria decreased, while that in nucleolus increased, meaning that IVP-02 was released from mitochondria and migrated to nucleolus. Then after removal of CCCP with the recovery of $\Delta\psi_m$, the fluorescence in nucleolus disappeared, while the fluorescence in mitochondria recovered gradually, indicating that IVP-02 migrated back to mitochondria. In addition to A549 cells, the similar results were also observed in HeLa cells shown in FIG. 16. Hydrogen peroxide ($H_2O_2$) can inhibit the oxidation respiratory chain that would cause the loss of cell viability. Then live A549 and HeLa cells were pre-stained with IVP-02, and treated with 10 mM $H_2O_2$. In FIG. 17, it could be seen that after adding $H_2O_2$ with the cell viability decreasing, strong fluorescence was observed in nucleolus. These results indicated that IVP-02 could monitor cancer cell viability through mitochondrion-nucleolus migration.

To test whether IVP-02 could selectively stain cancer cells and monitor their viability, cancer cells and normal cells were co-cultured and stained with IVP-02. As we predicted, only mitochondrial morphology in A549 cells were clearly shown in FIG. 15B. After CCCP was added, IVP-02 was released from mitochondria and migrated to nucleolus. After CCCP was removed, the fluorescence in nucleolus disappeared, while the fluorescence in mitochondria recovered gradually. In the whole process, little fluorescence was observed in normal cells COS7. The same experiments were also carried out in HeLa cells co-cultured with COS7 cells shown in FIG. 15B and similar phenomena were observed. These results demonstrated that IVP-02 could selectively stain cancer cells and monitor their viability through mitochondrion-nucleolus migration in coexisted cancer cells and normal cells.

Figure 18:
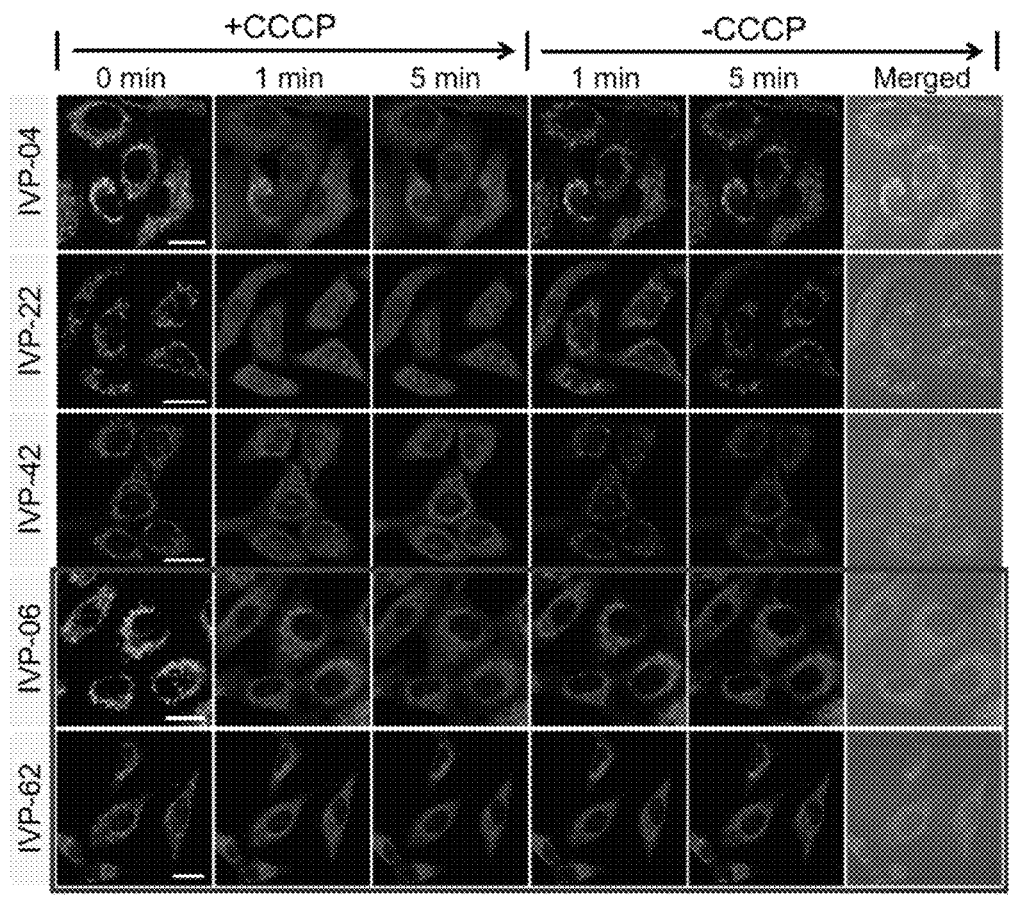
FIG. 18 Live A549 cells were pre-stained with 2 μM IVP-04, 22, 42, 06, 62 for 30 min, and treated with 20 μM CCCP for 5 min. Then CCCP was removed away and fresh culture medium was added for another 5 min, respectively. $\lambda_{ex}$=488 nm, $\lambda_{em}$=500-650 nm. Scale bar=20 μm.
Figure 19:
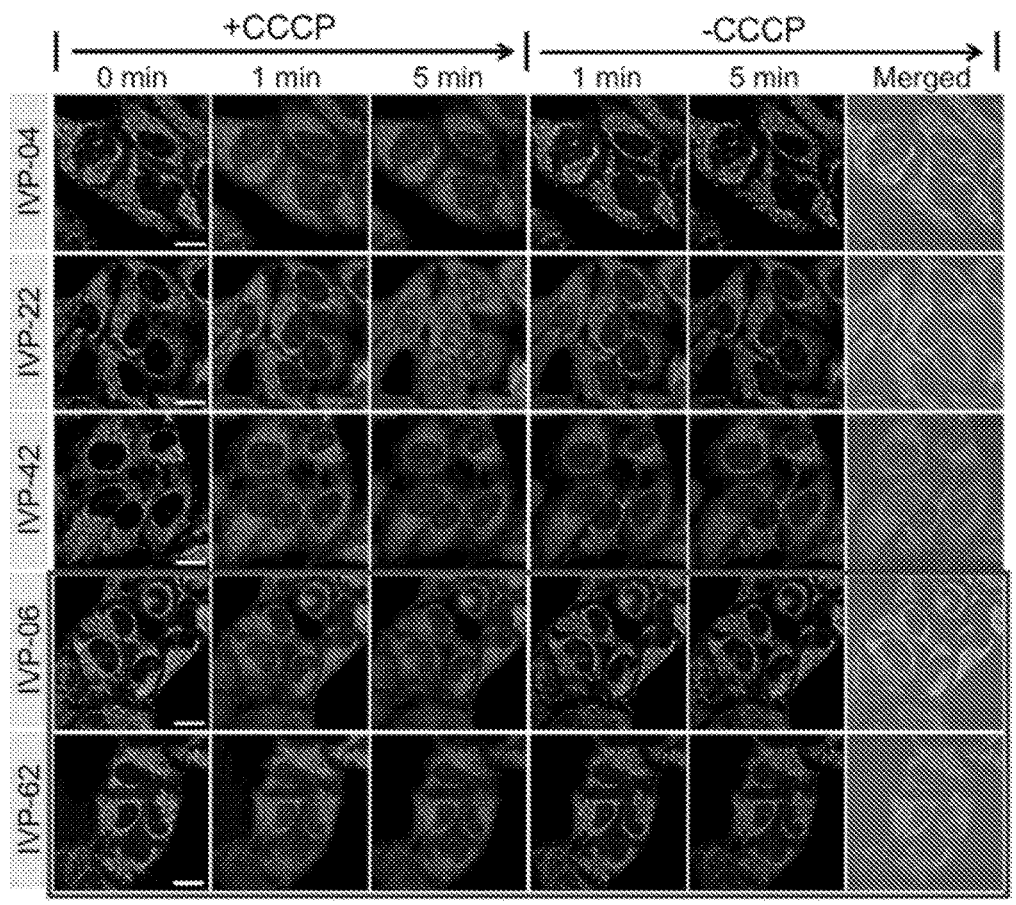
FIG. 19 Live HeLa cells were pre-stained with 2 μM IVP-04, 22, 42, 06, 62 for 30 min, and treated with 20 μM CCCP for 5 min. Then CCCP was removed away and fresh culture medium was added for another 5 min, respectively. $\lambda_{ex}$=488 nm, $\lambda_{em}$=500-650 nm. Scale bar=20 μm.

In addition to IVP-02, we further investigated whether other IVP molecules could monitor the viability of cancer cells through mitochondrion-nucleolus migration was investigated. A549 cells were pre-stained with IVP-04, 22, 42, 06, and 62, respectively, and then CCCP was added. In FIG. 18, after addition of CCCP with $\Delta\psi_m$ decreasing, only IVP-04, 22, and 42 could enter nucleus and stain nucleolus, while IVP-06 and 62 did not enter the nuclear to a substantial degree. After removal of CCCP with the recovery of $\Delta\psi_m$, IVP-04, 22, and 42 could migrate back in mitochondria. To eliminate cell interference, the same experiments were done in HeLa cells shown in FIG. 19. Consistent with that in A549 cells, IVP-02, 04, 22, and 42 could stain nucleolus while IVP-06 and 62 cannot. Based on these results, it was concluded that IVP-02, 04, 22, and 42 can monitor the viability of cancer cells through mitochondrion-nucleolus migration.

Figure 20:
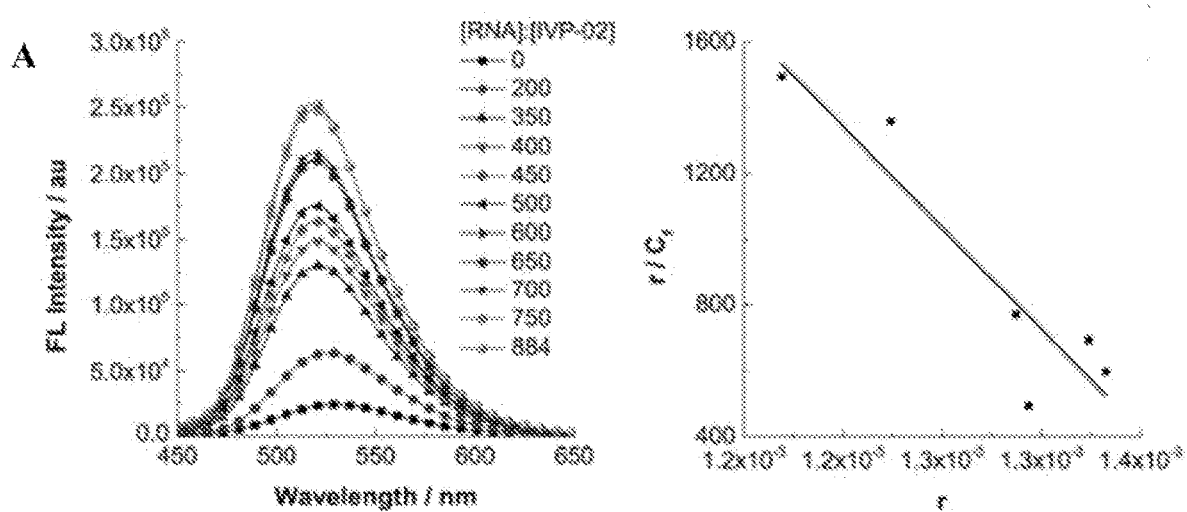
FIG. 20 (A) Fluorescence titration (left) of IVP-02 with RNA and the fitted curve (right) according to Scatchard equation. (B) The binding mode of IVP-02 to RNA. (C) Binding constant (k) and binding energy (E) of IVP molecules to RNA.
Figure 20:
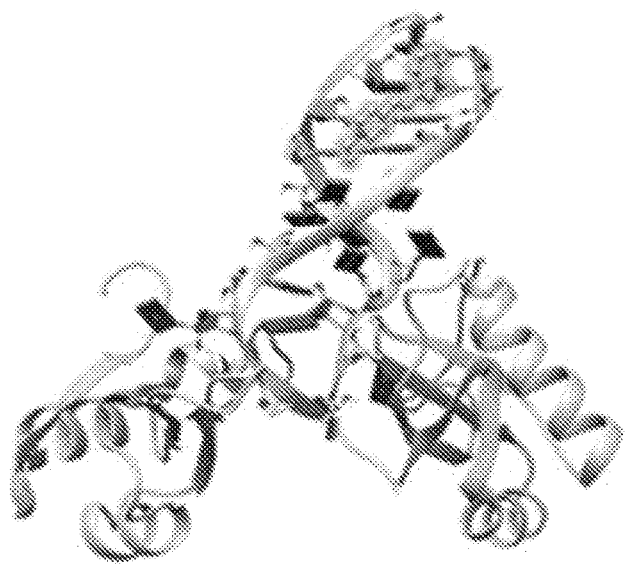
Figure 21:
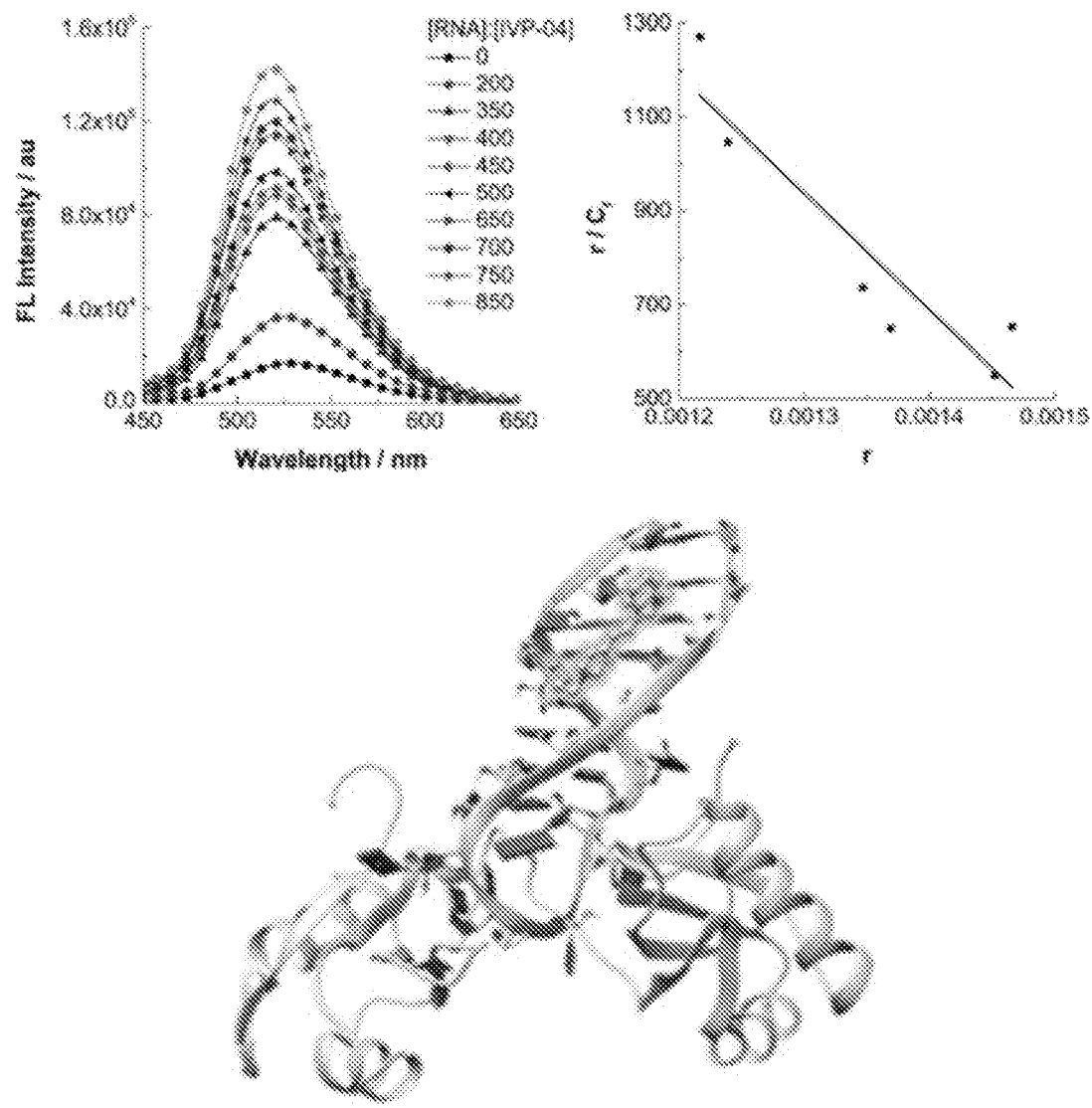
FIG. 21 Fluorescence titration (left) of IVP-04, 22, 42, 06, and 62 with RNA and the fitted curve (middle) according to Scatchard equation, and the binding mode (right) of them to RNA.
Figure 21:
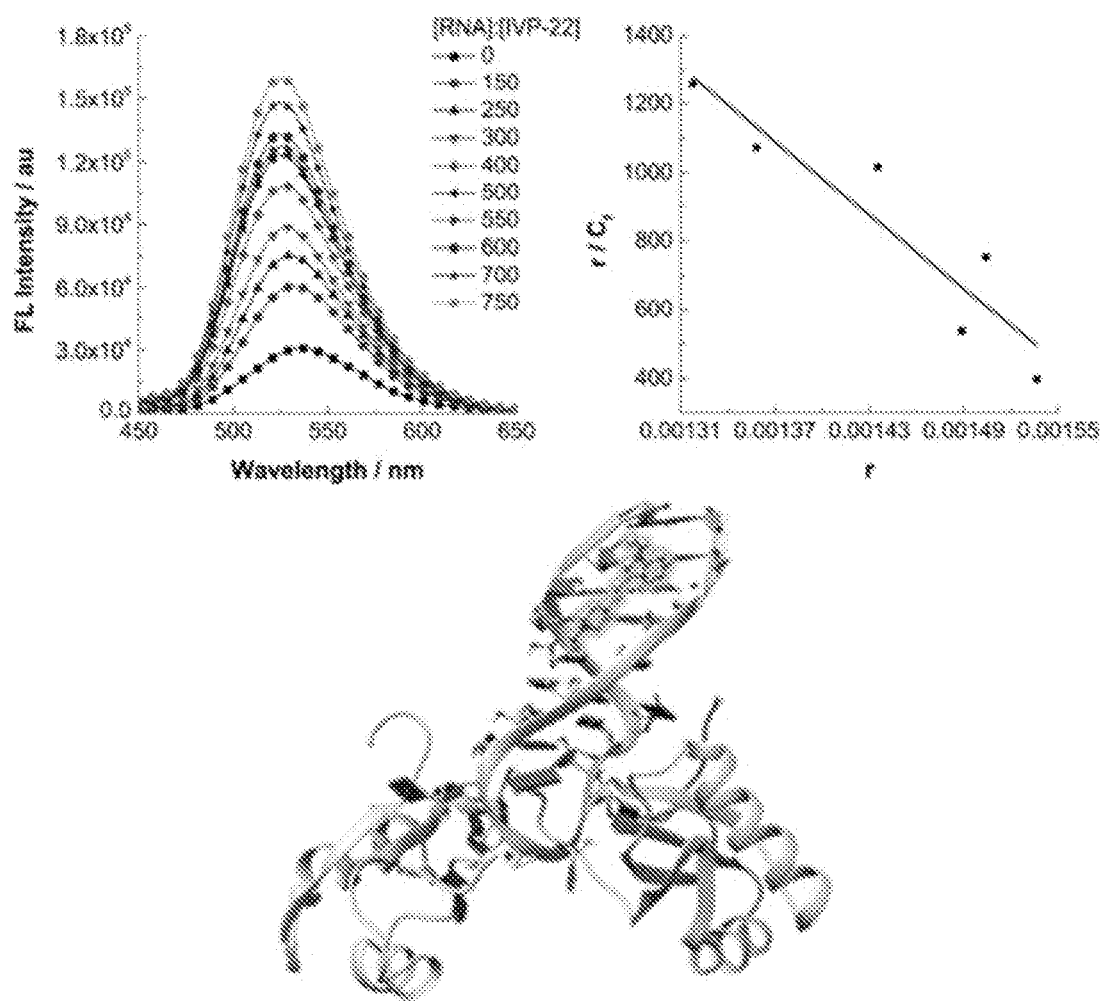
Figure 21:
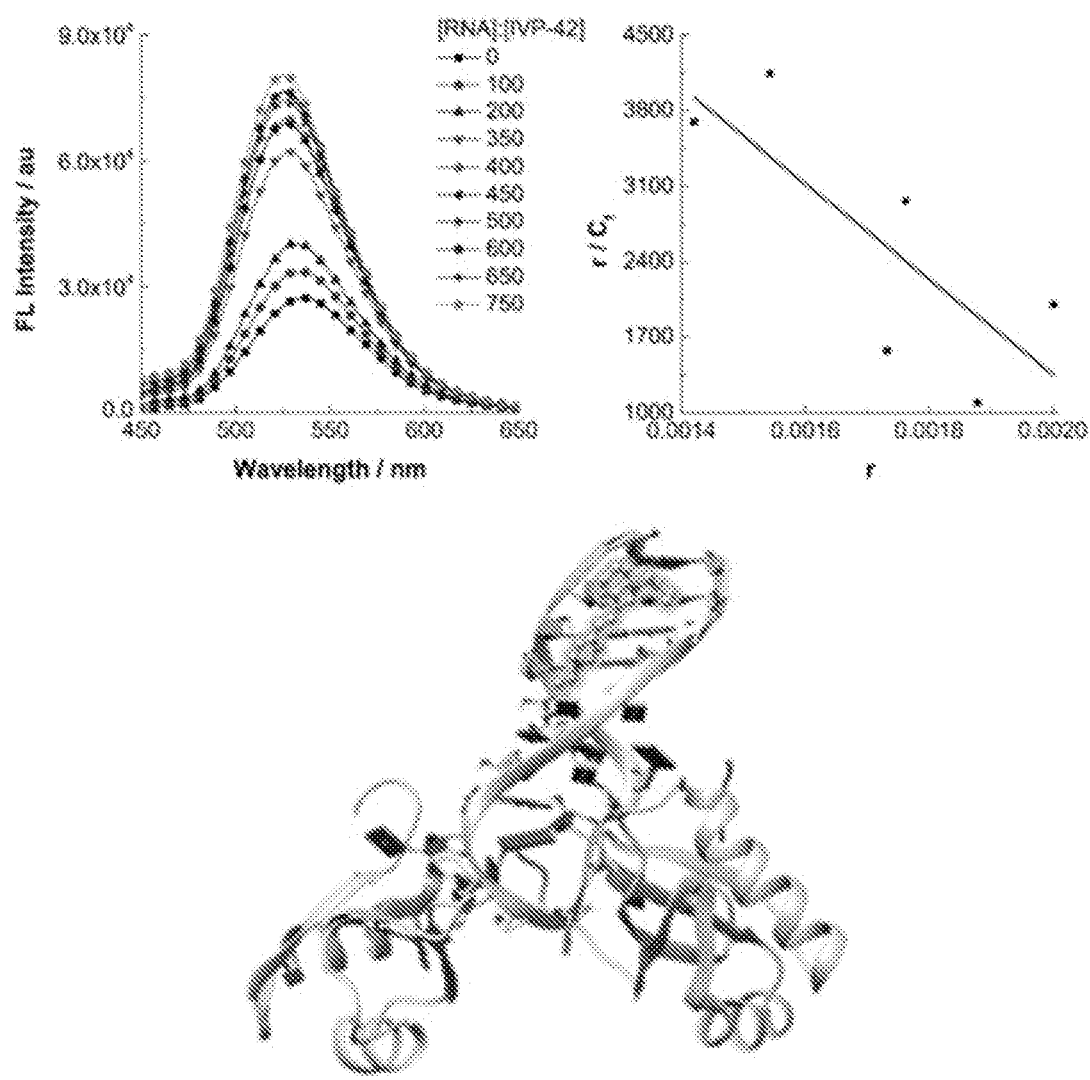
Figure 21:
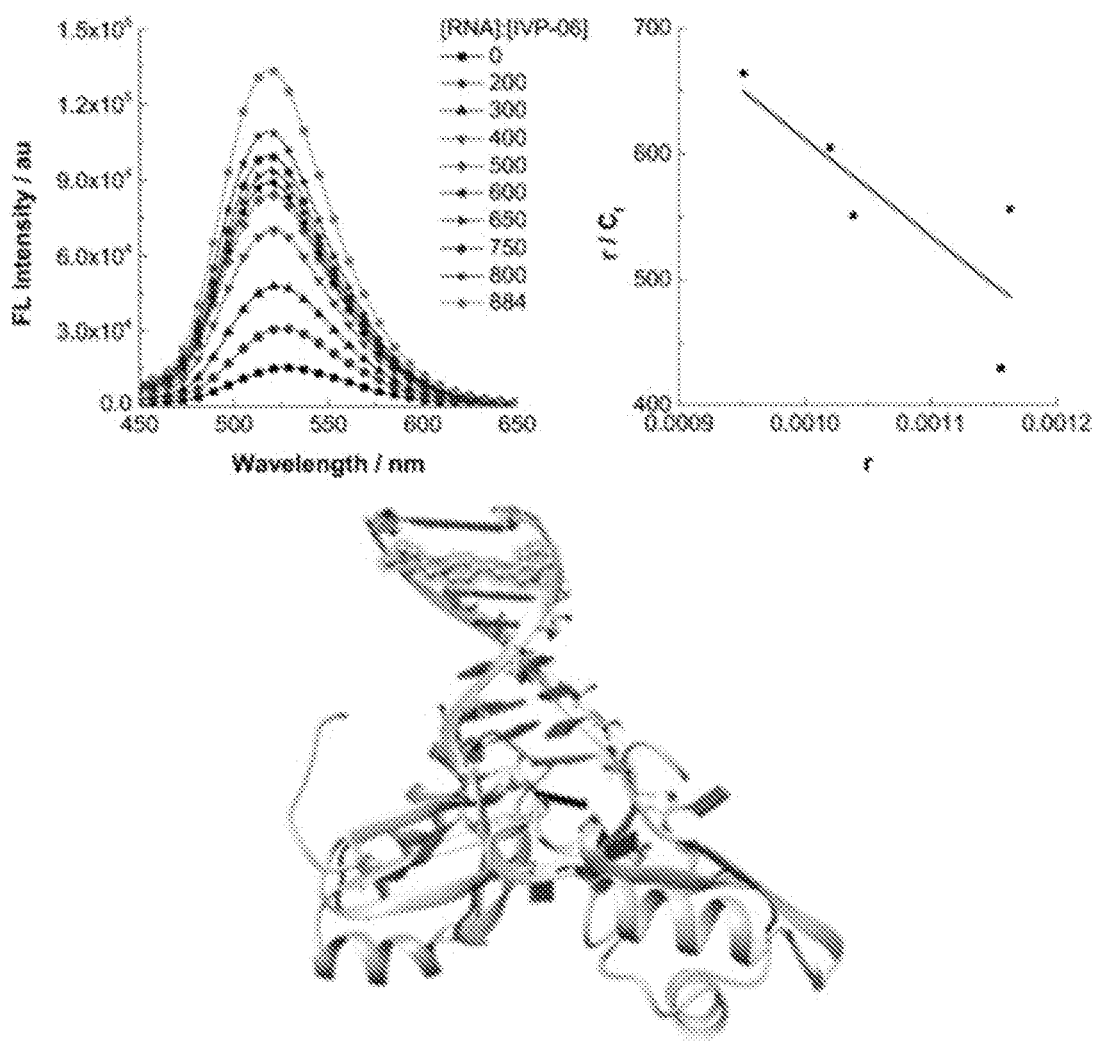
Figure 21:
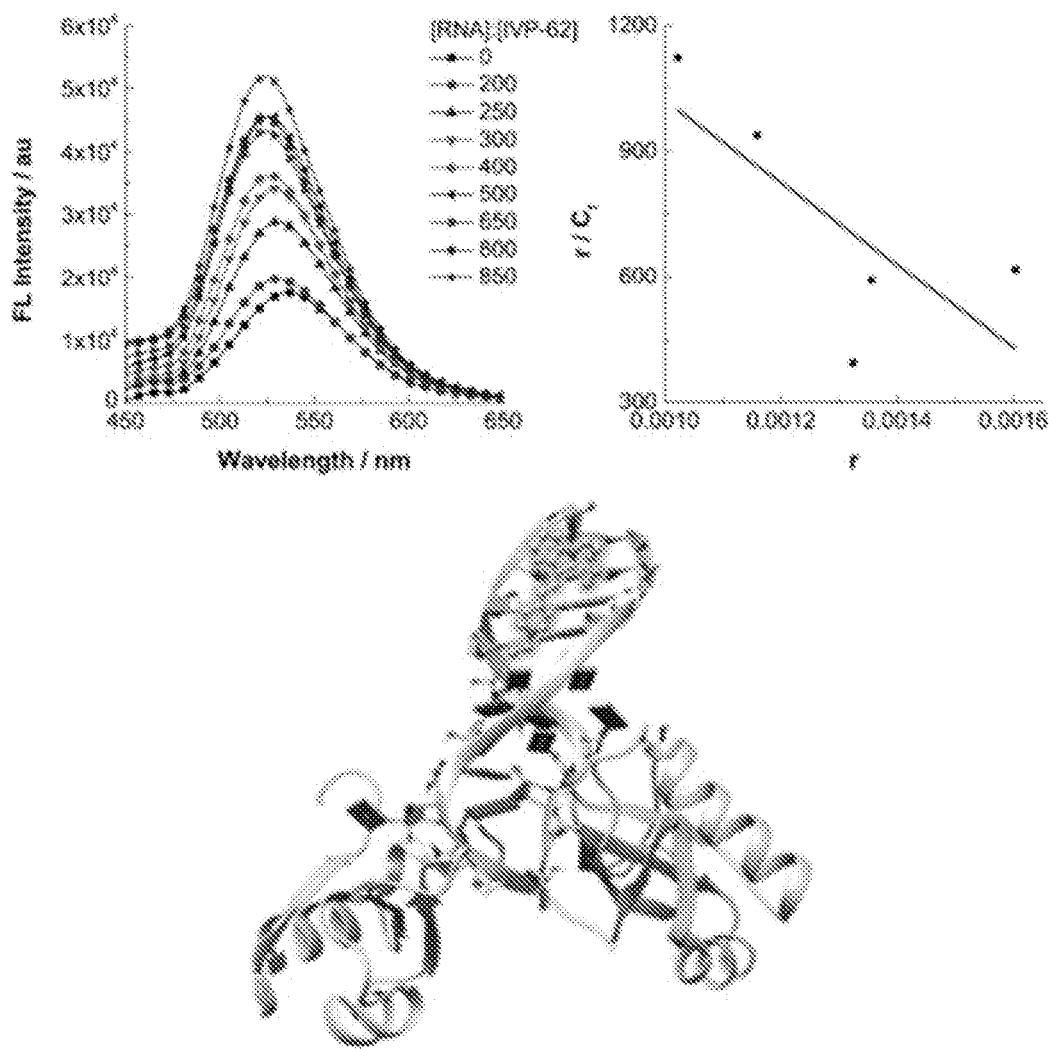

Why IVP-06 and 62 cannot stain the nucleolus in cancer cells to a significant extent? On one hand, when IVP molecules located in mitochondria, in addition to the electrostatic interaction between the cation and inner membrane negative charge of mitochondria, the hydrophobic interaction between alkyl chain and phospholipids also existed. When $\Delta\psi_m$ decreased, although the electrostatic interaction weakened, the hydrophobic interaction still remained. IVP-06 and 62 have longer alkyl chain than the other four IVP molecules, so the hydrophobic interaction between IVP-06 and 62 and phospholipids is stronger than that of the other four IVP molecules. Therefore, IVP-06 and 62 are more inclined to stay at the mitochondria, while IVP-02, 04, 22, and 42 are easier to escape from mitochondria. On the other hand, the affinity of IVP molecules to RNA should also be considered as nucleolus is rich in RNA. Then RNA titration experiments were first performed. In FIGS. 20A and 21, with the increase of RNA concentration, the fluorescence intensity of all the molecules increases. Based on the Scatchard equation, the binding constant (k) of these molecules to RNA was calculated and summarized in FIG. 20C. It could be seen that the binding constant of IVP-06 and 62 is lower than that of IVP-02, 04, 22, and 42. Moreover, molecular docking calculations based on the structure of IVP molecules and RNA have also been performed. In FIG. 20B and FIG. 21, IVP molecules bound to the minor grooves of RNA, and the binding energy (E) was calculated and summarized in FIG. 20C. The calculated binding energy of IVP-02, 04, 22, and 42 is also higher than that of IVP-06 and 62, indicating that IVP-02, 04, 22, and 42 have stronger affinity to RNA than that of IVP-06 and 62.

Given the high two-photon absorption cross section values of IVP-02 excited by 800 nm, we performed in vitro two-photon imaging of IVP-02 in live HeLa cells. As displayed in FIG. 22A, bright two-photon fluorescence with high fidelity from filamentous structures of mitochondria in cytoplasm could be clearly collected, demonstrating that IVP-02 has great potentials in two-photon imaging.

Figure 22:
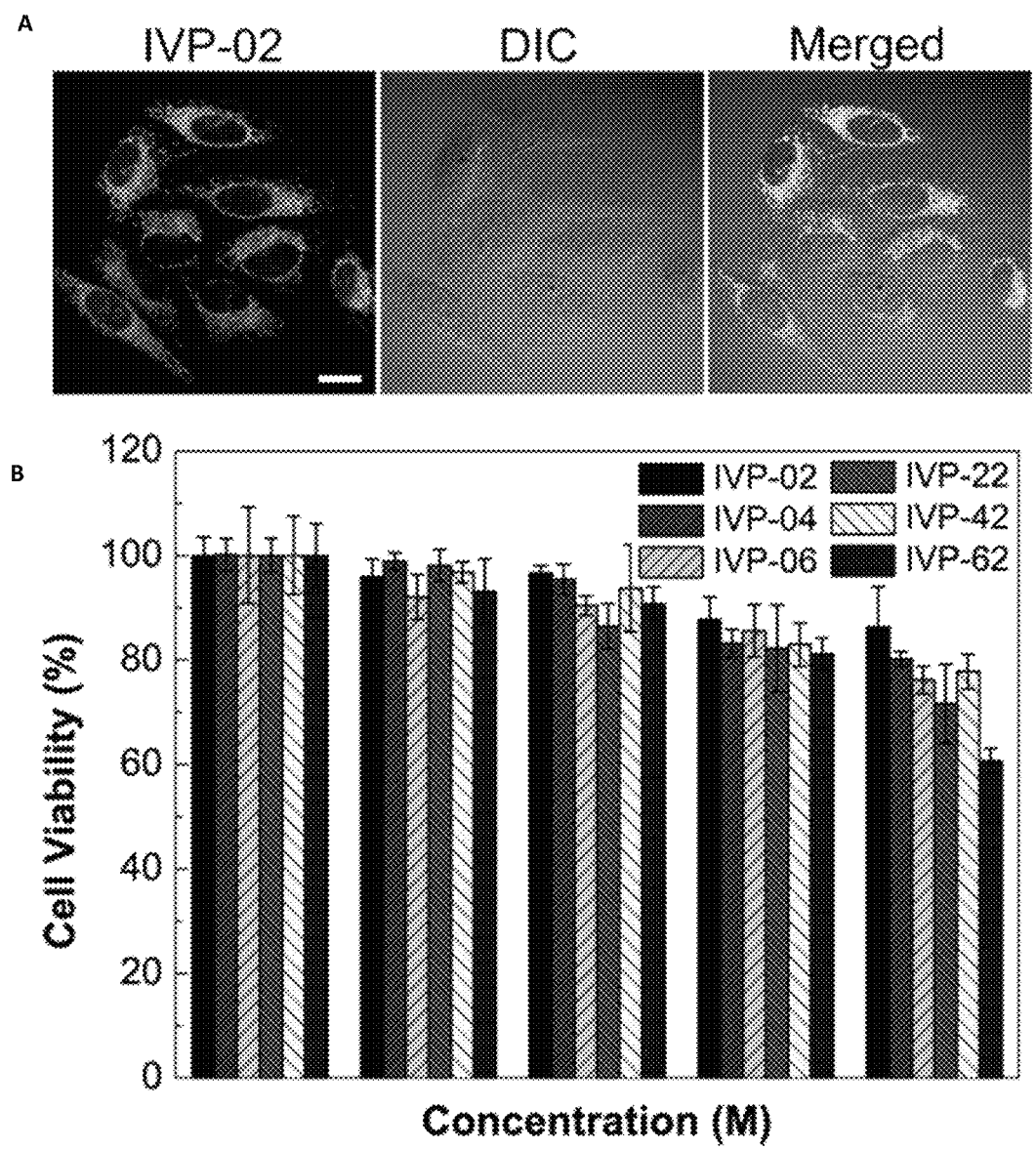
FIG. 22 (A) Two-photon microscopy images of live HeLa cells stained with 2 μM IVP-02 for 30 min. $\lambda_{ex}$=800 nm, $\lambda_{em}$=495-540 nm. Scale bar=20 µm. (B) Viability of A549 cells after incubation with IVP-02, 04, 06, 22, 42, and 62 at different concentrations for 24 h.

The potential long-term cytotoxicity of bioprobes should be carefully considered for imaging in live cells. Then we studied the cytotoxicity of these IVP molecules to live A549 cells by standard MTT assay. In FIG. 22B, it's clear to see that the viability of A549 cells was higher than 80% after incubation with IVP molecules at concentration less than 5 µM for 24 h, exhibiting very low cytotoxicity. While the incubation concentration is 10 µM, the cell viability was between 60% and 80%, showing certain cytotoxicity. Nonetheless, all cell imaging experiments in this work were conducted at low concentration 2 µM, which is reasonable and acceptable.

EXAMPLES

Since the synthesis routes and experimental procedures of the IVP molecules are very similar. Here we take IVP-02 as an example.

Synthesis of IVP-02: Compound 1-ethyl-4-methylpyridin-1-ium iodide was first synthesized. 4-methylpyridine (1 mL, 10 mmol) was dissolved in ethanol (5 mL) and iodoethane (1 mL, 12 mmol) was added. The mixture was stirred at 78° C. overnight. Then the reaction mixture was poured into petroleum ether, and the light yellow solid was filtrated. After recrystallization, compound 1-ethyl-4-methylpyridin-1-ium iodide was obtained as a light yellow solid (2.24 g, 90%). Then IVPI-2 was synthesized. Pyrrolidine (200 µL) was added to the solution of 1H-indole-3-carbaldehyde (0.15 g, 1 mmol) and compound 1-ethyl-4-methylpyridin-1-ium iodide (0.25 g, 1 mmol) dissolved in methanol (5 mL). The mixture was stirred at room temperature for 5 h. Then the reaction mixture was poured into petroleum ether, and the orange solid was filtrated. After recrystallization, IVPI-12 was obtained as an orange solid (0.26 g, 65%). Finally, IVP-02 was synthesized. IVPI-2 (0.11 g, 0.3 mmol) was dissolved in acetone (10 mL), and a solution of $KPF_6$ (0.55 g, 3 mmol) in was added. The mixture was stirred at room temperature for 24 h. Acetone was removed under reduced pressure and the residue was purified by silica gel chromatography using $CH_2Cl_2$/MeOH mixture (8:1, v/v) as eluent to give IVP-02 as an orange red solid (66 mg, 56%). $^{1}$H NMR (400 MHz, DMSO-d$_{6}$), δ (ppm): 11.92 (s, 1H), 8.77 (d, J=6.60 Hz, 2H), 8.25 (d, J=16.20 Hz, 1H), 8.15 (dd, J=11.70 Hz, 6.80 Hz, 3H), 7.97 (s, 1H), 7.51 (dd, J=6.90 Hz, 1.90 Hz, 1H), 7.34-7.19 (m, 3H), 4.44 (q, J=7.30 Hz, 2H), 1.51 (t, J=7.30 Hz, 3H). $^{13}$C NMR (100 MHz, MeOD-d$_{4}$), δ (ppm): 155.14, 141.82, 137.43, 136.53, 131.42, 127.88, 124.43, 122.33, 121.28, 120.65, 119.31, 115.68, 113.49, 111.38, 54.41, 14.56. $^{19}$F NMR (376 MHz, MeOD-d$_{4}$), δ (ppm): (−73.73, 3F), (−75.61, 3F). HRMS m/z: calcd for C$_{17}$H$_{17}$N$_{2}$+249.1386, found 249.1375 ([M]$^{+}$).

For IVP-04, $^{1}$H NMR (400 MHz, DMSO-d$_{6}$), δ (ppm): 11.95 (s, 1H), 8.76 (d, J=6.60 Hz, 2H), 8.25 (d, J=16.20 Hz, 1H), 8.14 (dd, J=11.80 Hz, 7.50 Hz, 3H), 7.97 (s, 1H), 7.52 (dd, J=7.00 Hz, 1.90 Hz, 1H), 7.35-7.21 (m, 3H), 4.41 (t, J=7.3 Hz, 2H), 1.86 (q, J=7.40 Hz, 2H), 1.29 (m, 2H), 0.93 (t, J=7.40 Hz, 3H). $^{13}$C NMR (100 MHz, DMSO-d$_{6}$), δ (ppm): 154.34, 143.09, 137.36, 136.30, 132.27, 124.66, 122.82, 121.71, 120.05, 116.60, 113.41, 112.45, 58.69, 32.25, 18.62, 13.16. $^{19}$F NMR (376 MHz, DMSO-d$_{6}$) δ (ppm): −69.18 (s, 3F), −71.07 (s, 3F).

For IVP-06, $^{1}$H NMR (400 MHz, Acetone-d$_{6}$), δ (ppm): 11.12 (s, 1H), 8.87-8.81 (m, 2H), 8.35 (d, J=16.20 Hz, 1H), 8.24 (d, J=6.60 Hz, 2H), 8.17 (d, J=7.60 Hz, 1H), 8.02 (d, J=2.60 Hz, 1H), 7.60 (d, J=7.80 Hz, 1H), 7.45 (d, J=16.20 Hz, 1H), 7.37-7.22 (m, 2H), 4.67 (t, J=7.50 Hz, 2H), 1.47-1.30 (m, 6H), 0.90 (t, J=6.90 Hz, 3H). $^{13}$C NMR (100 MHz, Acetone-d$_{6}$), δ (ppm): 154.88, 142.59, 137.40, 136.32, 131.79, 124.60, 122.59, 121.61, 120.89, 120.85, 119.74, 116.36, 113.62, 111.93, 59.44, 30.33, 30.29, 24.88, 21.51, 12.65. $^{19}$F NMR (376 MHz, Acetone-d$_{6}$), δ (ppm): −71.62 (s, 3F), −73.50 (s, 3F).

For IVP-22, $^{1}$H NMR (400 MHz, MeOD-d$_{4}$), δ (ppm): 8.55 (d, J=5.60 Hz, 2H), 8.15 (d, J=16.10 Hz, 1H), 8.07 (dd, J=7.30 Hz, 1.50 Hz, 1H), 8.00 (d, J=7.00 Hz, 2H), 7.87 (s, 1H), 7.53 (d, J=7.90 Hz, 1H), 7.34-7.17 (m, 3H), 4.45 (q, J=7.30 Hz, 2H), 4.29 (q, J=7.30 Hz, 2H), 1.59 (m, 3H), 1.49 (m, 3H). $^{13}$C NMR (100 MHz, DMSO-d$_{6}$), δ (ppm): 154.21, 142.94, 136.86, 135.59, 133.89, 125.38, 122.81, 121.75, 121.22, 120.48, 116.64, 112.62, 110.84, 54.37, 40.76, 15.98, 15.00. $^{19}$F NMR (376 MHz, MeOD-d$_{4}$) δ (ppm): −73.84 (s, 3F), −75.72 (s, 3F).

For IVP-42, $^{1}$H NMR (400 MHz, DMSO-d$_{6}$), δ (ppm): 8.77 (d, J=6.60 Hz, 2H), 8.26-8.15 (m, 2H), 8.13 (d, J=6.60 Hz, 2H), 8.01 (s, 1H), 7.63 (d, J=8.00 Hz, 1H), 7.36-7.24 (m, 3H), 4.44 (q, J=7.40 Hz, 2H), 4.27 (t, J=7.00 Hz, 2H), 1.78 (t, J=7.50 Hz, 2H), 1.51 (t, J=7.20 Hz, 3H), 1.25 (dd, J=14.30 Hz, 6.90 Hz, 2H), 0.90 (t, J=7.30 Hz, 3H). $^{13}$C NMR (100 MHz, DMSO-d$_{6}$), δ (ppm): 154.20, 142.94, 137.15, 135.57, 134.52, 125.31, 122.81, 121.76, 121.18, 120.46, 116.71, 112.52, 110.95, 54.37, 45.54, 31.39, 19.25, 15.97, 13.34. $^{19}$F NMR (376 MHz), δ (ppm): −69.17 (s, 3F), −71.05 (s, 3F).

For IVP-62, $^{1}$H NMR (400 MHz, MeOD-d$_{4}$), δ (ppm): 8.49 (d, J=6.70 Hz, 2H), 8.14-8.01 (m, 2H), 7.94 (d, J=6.90 Hz, 2H), 7.83 (s, 1H), 7.50 (dd, J=7.60 Hz, 1.40 Hz, 1H), 7.34-7.24 (m, 2H), 7.17 (d, J=16.10 Hz, 1H), 4.42 (q, J=7.40 Hz, 2H), 4.22 (t, J=7.10 Hz, 2H), 1.86 (t, J=7.20 Hz, 2H), 1.58 (t, J=7.30 Hz, 3H), 1.35-1.26 (m, 6H), 0.92-0.80 (m, 3H). $^{13}$C NMR (100 MHz, DMSO-d$_{6}$), δ (ppm): 154.21, 143.25, 142.93, 137.15, 135.59, 134.53, 125.54, 125.30, 122.81, 121.77, 121.19, 120.46, 119.10, 116.70, 112.52, 110.94, 54.37, 45.82, 30.60, 29.26, 25.65, 21.82, 15.96, 13.69. $^{19}$F NMR (376 MHz, MeOD-d$_{4}$) δ (ppm): −73.45 (s, 3F), −75.33 (s, 3F).

What is claimed:

1. A method for imaging a cancer cell in a sample, the method comprising: contacting the sample with an aggregation-induced emission luminogen (AIEgen) selected from the group consisting of:

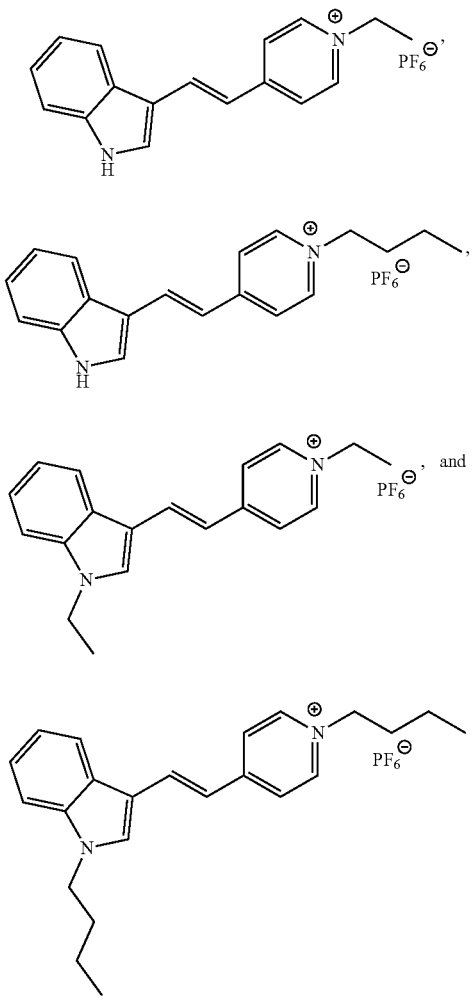

irradiating the cancer cell with light;

detecting fluorescence of the AIEgen, wherein the step of detecting the fluorescence of the AIEgen comprises monitoring migration of the AIEgen from mitochondrion to nucleolus of the cancer cell; and determining viability of the cancer cell based on the migration of the AIEgen from the mitochondrion to the nucleolus.

2. The method of claim 1, wherein the viability of the cancer cell is determined while the cancer cell is present with an anti-cancer agent.

3. The method of claim 1, wherein the cancer cell is irradiated with light at a wavelength between 350-550 nm; and the fluorescence is detected at a wavelength between 450-650 nm.

4. A method for detecting a cancer cell in a sample suspected of comprising the cancer cell, the method comprising: contacting the sample with an AIEgen selected from the group consisting of:

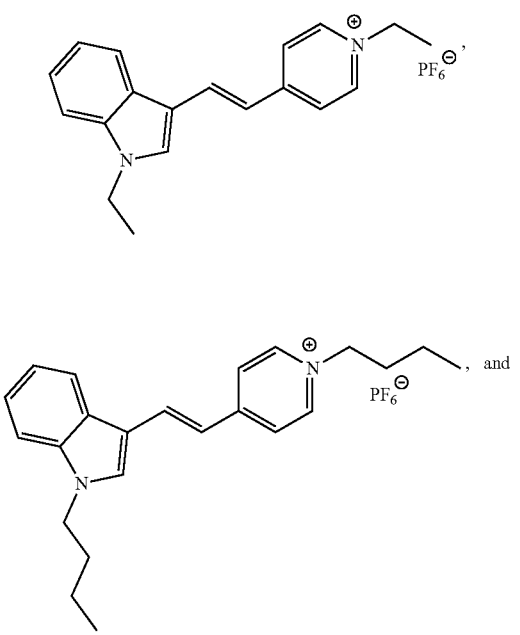
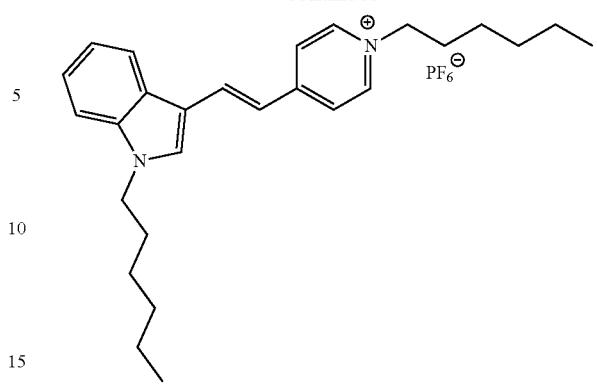
irradiating the sample with light;
detecting fluorescence of the AIEgen; and determining whether the sample comprises the cancer cell based on the detected fluorescence.
5. The method of claim 4, wherein the cancer cell is a lung cancer cell or a cervical cancer cell.
* * * * *